US012591229B2

(12) United States Patent
Srivastav

(10) Patent No.: US 12,591,229 B2
(45) Date of Patent: Mar. 31, 2026

(54) PERFORMANCE RECREATION SYSTEM

(71) Applicant: AIVOT, LLC, Seattle, WA (US)

(72) Inventor: Shashwat Srivastav, Seattle, WA (US)

(73) Assignee: AIVOT, LLC, Seattle, WA (US)

( * ) Notice: Subject to any disclaimer, the term of this patent is extended or adjusted under 35 U.S.C. 154(b) by 963 days.

(21) Appl. No.: 17/708,476

(22) Filed: Mar. 30, 2022

(65) Prior Publication Data

US 2022/0324107 A1     Oct. 13, 2022

Related U.S. Application Data

(63) Continuation of application No. 16/198,412, filed on Nov. 21, 2018, now Pat. No. 11,292,129.

(51) Int. Cl.
| | |
|---|---|
| *G05B 19/42* | (2006.01) |
| *B25J 9/16* | (2006.01) |
| *G06V 10/46* | (2022.01) |
| *G06V 10/764* | (2022.01) |
| *G06V 10/82* | (2022.01) |
| *G06V 20/10* | (2022.01) |
| *G06V 20/64* | (2022.01) |
| *G06V 40/10* | (2022.01) |

(52) U.S. Cl.
CPC .............. *G05B 19/42* (2013.01); *B25J 9/163* (2013.01); *B25J 9/1664* (2013.01); *B25J 9/1697* (2013.01); *G06V 10/462* (2022.01); *G06V 10/764* (2022.01); *G06V 10/82* (2022.01); *G06V 20/10* (2022.01); *G06V 20/64* (2022.01); *G06V 40/103* (2022.01); *G06V 40/107* (2022.01)

(58) Field of Classification Search
CPC .......... G05B 19/42; G05B 2219/40116; G05B 2219/40499; B25J 9/163; B25J 9/1664; B25J 9/1697; G06V 10/462; G06V 10/764; G06V 10/82; G06V 20/10; G06V 20/64; G06V 40/103; G06V 40/107
See application file for complete search history.

(56) References Cited

U.S. PATENT DOCUMENTS

| | | | |
|---|---|---|---|
| 10,768,708 | B1 | 9/2020 | Sills et al. |
| 2007/0255454 | A1 | 11/2007 | Dariush |
| 2016/0039097 | A1 | 2/2016 | Li et al. |
| 2016/0059412 | A1 | 3/2016 | Oleynik |
| 2017/0165844 | A1 | 6/2017 | Brockway et al. |
| 2017/0344832 | A1 | 11/2017 | Leung et al. |

(Continued)

OTHER PUBLICATIONS

WO-2019021058-A2 (Year: 2019).*

(Continued)

*Primary Examiner* — Basil T. Jos
(74) *Attorney, Agent, or Firm* — Foley & Lardner LLP

(57) ABSTRACT

The present disclosure generally relates to performance recreation, and in particular, the recreation of observed human performance using reinforcement learning. In this regard, a first object is identified from a plurality of objects. The manipulation of the first object is tracked from a first position to a second position. A characterization of the manipulation is generated. A policy that controls a mechanical gripper to recreate the manipulation is generated based on an iteratively increasing cumulative award. The mechanical gripper iteratively recreates the manipulation to increase a cumulative award with each recreation.

16 Claims, 13 Drawing Sheets

(56) References Cited

U.S. PATENT DOCUMENTS

| 2018/0126553 A1* | 5/2018 | Corkum | B25J 9/1697 |
| 2018/0293498 A1 | 10/2018 | Campos et al. | |
| 2019/0232488 A1 | 8/2019 | Levine et al. | |
| 2019/0244050 A1 | 8/2019 | Lin et al. | |
| 2020/0401232 A1* | 12/2020 | Sills | B25J 13/08 |

OTHER PUBLICATIONS

James, S., and Johns, E., "3D Simulation for Robot Arm Control with Deep Q-Learning", arXiv:1609.03759v2 [cs.RO], pp. 1-6 (Dec. 13, 2016).

* cited by examiner

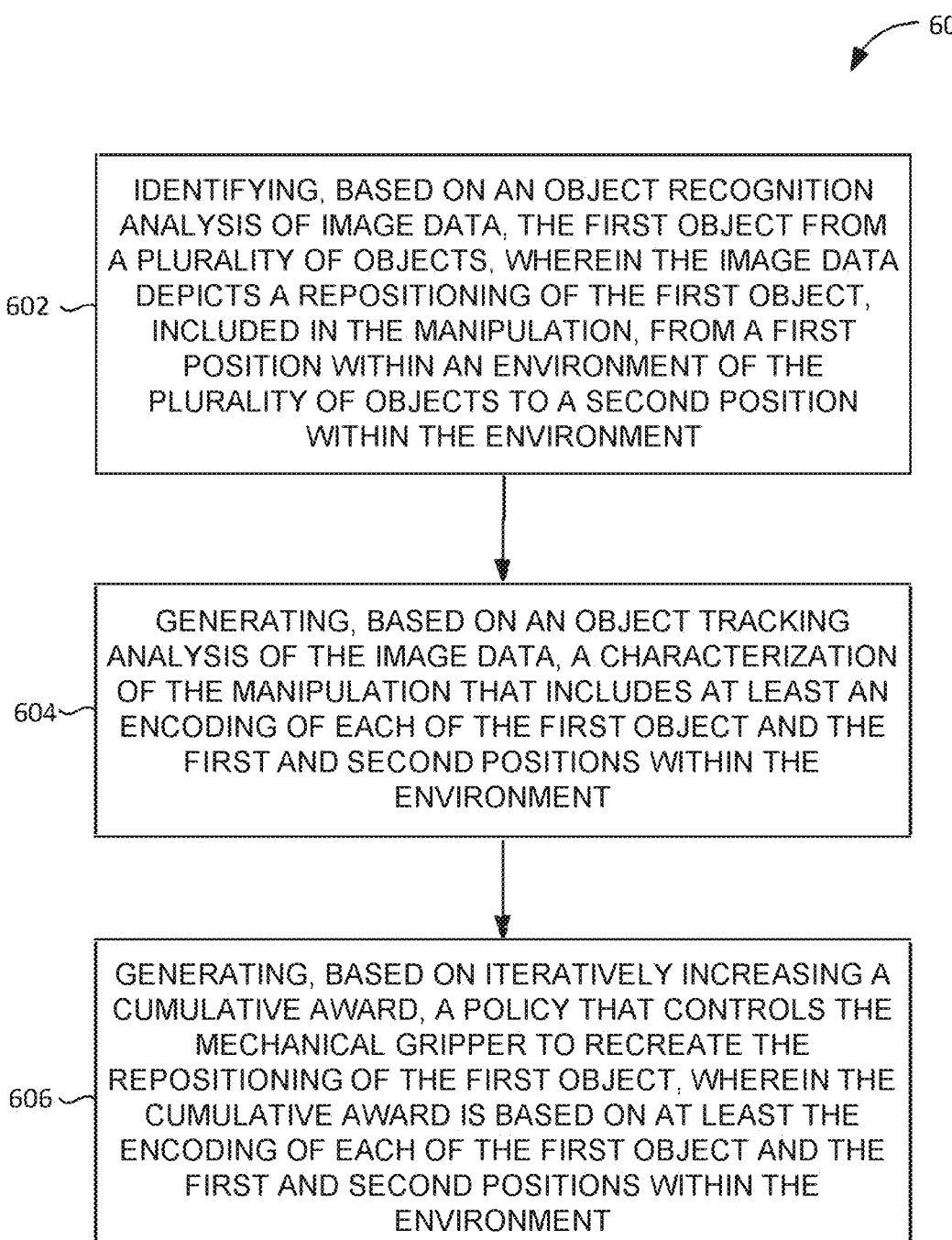

600

602 — IDENTIFYING, BASED ON AN OBJECT RECOGNITION ANALYSIS OF IMAGE DATA, THE FIRST OBJECT FROM A PLURALITY OF OBJECTS, WHEREIN THE IMAGE DATA DEPICTS A REPOSITIONING OF THE FIRST OBJECT, INCLUDED IN THE MANIPULATION, FROM A FIRST POSITION WITHIN AN ENVIRONMENT OF THE PLURALITY OF OBJECTS TO A SECOND POSITION WITHIN THE ENVIRONMENT

604 — GENERATING, BASED ON AN OBJECT TRACKING ANALYSIS OF THE IMAGE DATA, A CHARACTERIZATION OF THE MANIPULATION THAT INCLUDES AT LEAST AN ENCODING OF EACH OF THE FIRST OBJECT AND THE FIRST AND SECOND POSITIONS WITHIN THE ENVIRONMENT

606 — GENERATING, BASED ON ITERATIVELY INCREASING A CUMULATIVE AWARD, A POLICY THAT CONTROLS THE MECHANICAL GRIPPER TO RECREATE THE REPOSITIONING OF THE FIRST OBJECT, WHEREIN THE CUMULATIVE AWARD IS BASED ON AT LEAST THE ENCODING OF EACH OF THE FIRST OBJECT AND THE FIRST AND SECOND POSITIONS WITHIN THE ENVIRONMENT

FIG. 6

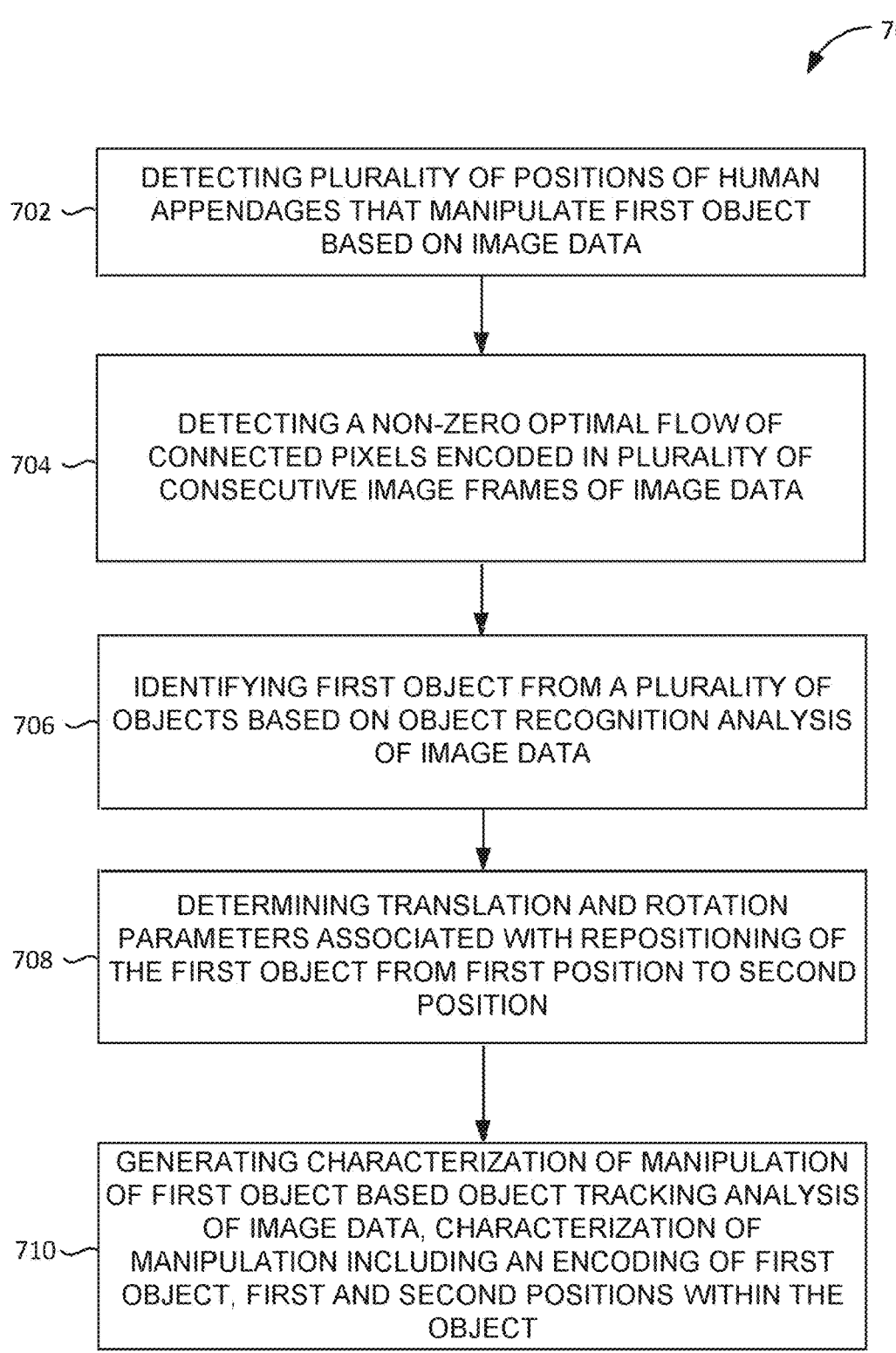

700

702 — DETECTING PLURALITY OF POSITIONS OF HUMAN APPENDAGES THAT MANIPULATE FIRST OBJECT BASED ON IMAGE DATA

704 — DETECTING A NON-ZERO OPTIMAL FLOW OF CONNECTED PIXELS ENCODED IN PLURALITY OF CONSECUTIVE IMAGE FRAMES OF IMAGE DATA

706 — IDENTIFYING FIRST OBJECT FROM A PLURALITY OF OBJECTS BASED ON OBJECT RECOGNITION ANALYSIS OF IMAGE DATA

708 — DETERMINING TRANSLATION AND ROTATION PARAMETERS ASSOCIATED WITH REPOSITIONING OF THE FIRST OBJECT FROM FIRST POSITION TO SECOND POSITION

710 — GENERATING CHARACTERIZATION OF MANIPULATION OF FIRST OBJECT BASED OBJECT TRACKING ANALYSIS OF IMAGE DATA, CHARACTERIZATION OF MANIPULATION INCLUDING AN ENCODING OF FIRST OBJECT, FIRST AND SECOND POSITIONS WITHIN THE OBJECT

FIG. 7

PERFORMANCE RECREATION SYSTEM

CROSS-REFERENCE TO RELATED APPLICATIONS

This application is a continuation of U.S. patent application Ser. No. 16/198,412, filed Nov. 21, 2018, the entire contents of which is hereby incorporated by reference in its entirety

BACKGROUND

The study of robotics, that is, the study of autonomous and semi-autonomous programmable machines designed to use sensors and actuators to interact with the physical world, has been extensively researched. In recent years, robots that can perform actions traditionally performed by humans has emerged as a primary field of interest in robotics. Conventionally, designing a robot to perform human-like tasks (i.e., robotic mimicking) requires complex manual programming by humans. This necessitates conventional robots to be task-specific and include expensive hardware. Traditional robots can hence become both costly and time consuming.

The advent of artificial intelligence (AI), the branch of computer science involving the development of computer programs to complete tasks which would otherwise require human intelligence, has altered the way in which robotics is studied and how robots are designed and developed. While robotic programming has largely moved away from low-level coding to more intuitive methods, fueled at least in part by a desire to make programming easier for operators, much is left to be desired and the tasks that conventional robots can perform are prohibitively limited.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Aspects of this disclosure relate to performance recreation of an observed manipulation of an object (e.g., observed demonstration) by combining machine vision and reinforcement learning. That is, the technologies enable a robot to observe (via machine vision) a human performing a demonstration, e.g., pouring a glass of water, repositioning a book on a table, and the like, and learn to recreate the performance (via reinforcement learning) by iteratively attempting to execute the performance and observing award. That is, embodiments described herein enable a robot to, via machine vision, identify a first object, identify a human, observe the manipulation (e.g., repositioning) of the first object from a first position to a second position, and then using reinforcement learning, learn to recreate the observed performance based on a cumulative award system. Each iteration of performance recreation is guided through a policy based on maximizing, or at least increasing, the cumulative award.

The method disclosed herein includes performing an object recognition analysis of image data to identify an object being manipulated in an environment. In some embodiments, the object may be identified by recognizing a non-zero optical flow of connected pixels near a human hand and/or digits (e.g., fingers) encoded in a plurality of consecutive images in the image data. The object recognition analysis of image data further identifies a first position and a second position of the object. The first position of the object may be the initial position of the object (i.e., the object's position at a beginning of a manipulation of the object), whereas the second position may be the position of the object at the end of the manipulation (i.e., the object's final or end position). By way of non-limiting example, a first position may refer to the position of the object at the beginning of a task (or the object's initial position), and a second position may refer to the position of the object once the task is successfully completed (or object's final position). In some embodiments, the image data may include intermediate positions of the object between the first and the second position. A characterization of the manipulation of the object is generated. The characterization of the manipulation is encoded in the image data in association with the object and its starting (i.e., first position) and ending (i.e., second position) positions. In some embodiments, a characterization of the manipulation of the object is based on translation and rotation parameters associated with repositioning of the object from the first position to the second position.

In some embodiments, the image data includes a plurality of visual images. The image data may be used to generate a three dimensional (3D) map of the robot's environment. The map may be created or generated by combining one or more images. In some embodiments, the visual images and/or the generated map may be semantically segmented to generate semantic images/maps with entities classified as representations (e.g., walls, large furniture, surface, human, etc.).

In some embodiments, the method may further include detecting and encoding positions of one or more human appendages (e.g., hands, digits, fingers, etc.) when manipulating the object. A convolutional neural network (CNN) may be used to detect human body parts in images. The positions may be encoded in the corresponding image data.

In further embodiments, the method disclosed herein also includes generating a policy to recreate the observed performance demonstration (e.g., manipulation of an object). In some cases, generating the policy is based on iteratively increasing a cumulative award for each subsequent iteration of performance recreation. The value of the cumulative award (or cumulative reward) is based on a summation of earned rewards (or awards), which may include earned intermediate rewards (or intermediate awards) and an earned final reward (or final award), during a performance recreation iteration. Once an iteration of performance recreation is completed, a cumulative award can be calculated. The method may employ and/or implement the policy to provide the robot with further guidance (e.g., control) for subsequent performance recreation iterations in an attempt to maximize, or at least increase, the cumulative award.

Briefly, a policy may include one or more rules, conditions, algorithms, models, and/or heuristics that are employed to determine which path to take to manipulate an object from a first position to a second position for an iteration. A policy may be a deterministic or a statistical/stochastic function. The policy is determined such that the cumulative award is maximized, or at least increased at each iteration.

In some embodiments, the policy may include, or at least be implemented via computer instructions or software routines for generating performance recreation. As discussed throughout, the determining of a policy may employ supervised or unsupervised machine learning or other statistical measures to determine aspects of performance recreation, or specific rules or logic for performance recreation. In some embodiments, machine learning, such as reinforcement learning (RL), may be employed to determine and/or update the policy based on the feedback events and corresponding previous cumulative awards.

In some embodiments, the method disclosed herein may include determining a current cumulative award associated with a current policy where the current cumulative award is the result of a performed iteration using the current policy. A comparison between the current cumulative award value and previous cumulative award values may be generated. If the comparison is favorable for the current cumulative award (i.e., if the cumulative award is greater than or equal to previous cumulative awards), an updated cumulative value of the updated recommendation policy may be generated. If the comparison is favorable for the updated recommendation policy, the updated recommendation policy may be deployed in a "live" online system.

BRIEF DESCRIPTION OF THE DRAWINGS

Aspects of the disclosure are described in detail below with reference to the attached figures, wherein:

FIG. 6 illustrates one embodiment of a method for observing and recreating a demonstrated performance that is consistent with the various embodiments presented herein.

FIG. 7 illustrates one embodiment of a method for observing a demonstrated performance that is consistent with the various embodiments presented herein.

DETAILED DESCRIPTION

Overview

Figure 1:
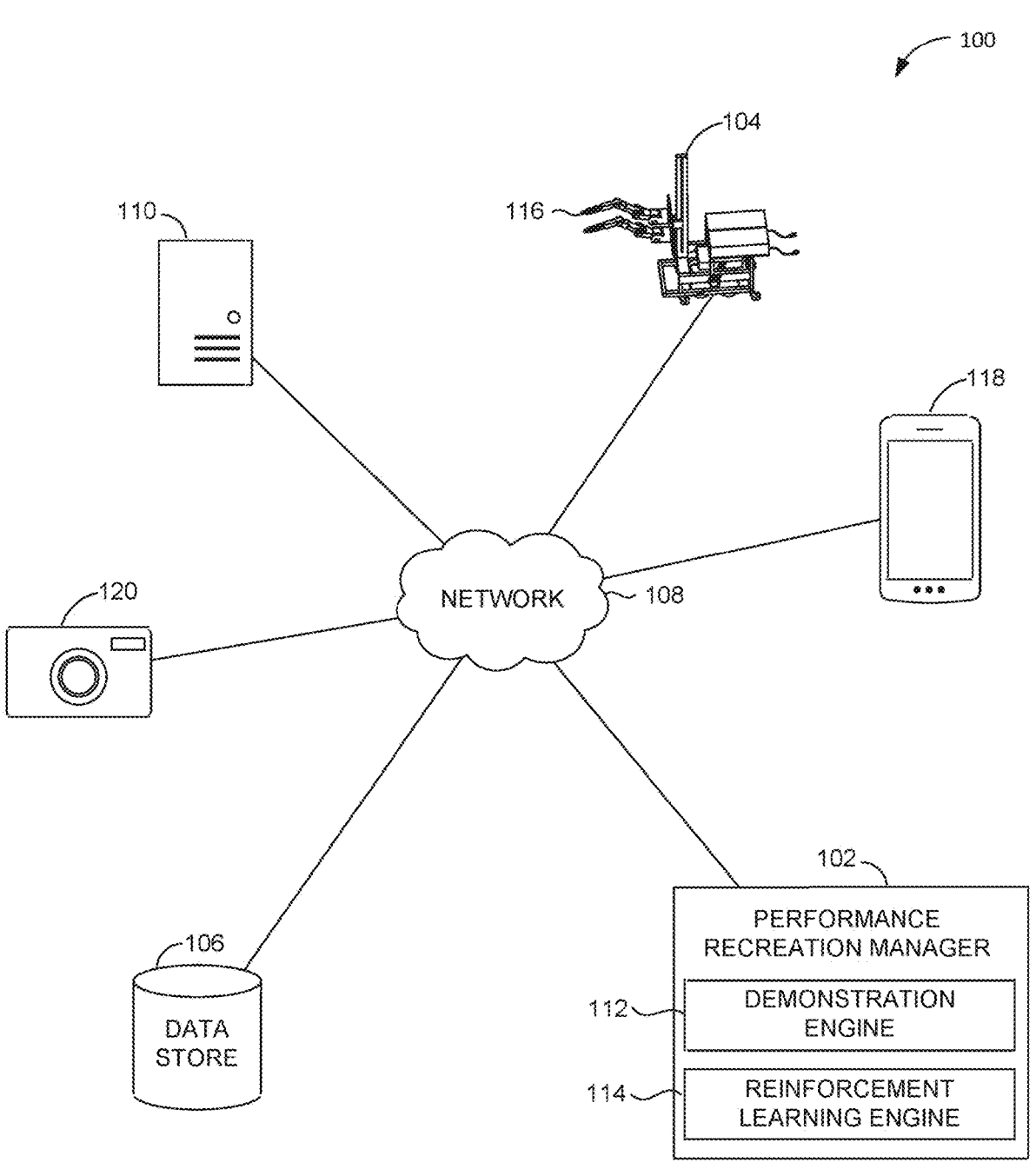
FIG. 1 illustrates a performance recreation system suitable for use in implementing various embodiments is presented herein.

In their most basic form, robots can be programmed to perform and automate human actions. The advent of artificial intelligence (AI), the branch of computer science involving the development of computer programs to complete tasks which would otherwise require human intelligence, has altered the way in which robotics is studied and how robots are designed and developed. The various embodiments herein are directed to artificially intelligent robots, i.e., robots that are controlled and/or operated via an artificially intelligent agent. One key aspect that differentiates conventional robots from the artificially intelligent robots herein, is that conventional robots are programmed to execute a defined sequence of instructions. In contrast, the artificially intelligent robots herein can be trained or can learn through a combination of machine/computer vision and reinforcement learning techniques to mimic various levels of human intelligence and human performance.

In this regard, the various embodiments of a robot can be taught, via observation of a human performance and reinforcement learning, to perform specific operations based on the observation of the human performance. The various embodiments enable a robot to perform actions traditionally performed by humans. The various embodiments enable one or more robots to take the place of humans by carrying out various skilled tasks in various capacities, such as in dangerous or volatile environments, manufacturing processes, medical procedures, administrative, personal assistance, and retail practices, and other tasks. In other words, enhanced robots described herein are capable of robotic mimicking, e.g., an artificially intelligent robot can use tools and operate equipment designed for the human form, as well as perform various human-oriented tasks.

For a conventional robot to perform human-like tasks often requires complex manual programming by humans. In particular, the manual programming of a conventional robot to enable robotic mimicking, requires a set of coded commands, or instructions, that tell a mechanical device and an electronic system what tasks to perform, and how to perform them. Such conventional manual programming can be both extensive and laborious. The amount of time and expense required for such manual programming necessitates conventional robots to be task-specific and include expensive hardware. In this regard, developing and implementing conventional robots capable of robotic mimicking can hence become both costly and time consuming.

Conventional deep learning has been employed in some robots to partially automate the performance of certain classes of generalizable tasks, such as machine vision. For instance, deep learned neural networks have enabled conventional robots to recognize and detect objects within their environment. However, conventional deep learning requires significant amounts of training data. Learning from large sets of training data, has several unique problems, chief among them being computational cost and manual curation.

In the employment of conventional deep learning to robots, training data is (often manually) curated with ground-truths. For many interesting tasks, a robot may need to do more than detect or recognize objects. For example, a conventional robot may need to sense a state of their environment and/or position within the environment. The conventional robot (or the robot's control agent) may then choose, based on an expected reward indicating progress or regress of successfully performing the task, an appropriate action to execute. For many such tasks, the number of possible environmental state-action pairs frequently becomes too large to address practically via conventional deep learning techniques that require labeled training data.

That is, the size of the required curated training data set is too large to generate practically. Furthermore, the time to compute a deep neural network that adequately handles the large number of possible state-action pairs would be too large to prove viable.

In contrast to such conventional methods, embodiments described herein are directed towards methods and systems for automatically recreating observed human performance (e.g., the manipulation of objects from a first position to a second position) based on a combination of machine vision and reinforcement learning. In this regard, embodiments described herein automatically recreate observed manipulations of objects by observing the manipulation (via machine/computer vision), and then learning how to recreate the manipulation while performing iterations of the task (via reinforcement learning). Thus, the various enhanced embodiments herein alleviate a significant portion of the cost, labor, and extensive training data associated with the manual programming of conventional robots and/or conventional deep learning applied to robots.

In one embodiment, an object recognition analysis of image data is employed to identify an object being manipulated in a robot's environment. An object may be identified by recognizing a non-zero optical flow of connected pixels near a human hand and/or fingers encoded in a plurality of consecutive images in the image data. In some embodiments, an object may be identified by generating mask proposals for objects in images/maps using a convolutional neural network (CNN). The mask proposals may then be matched against connected pixel patches with non-zero optical flow found in consecutive images. The top matching mask proposals may be determined to be an object of interest (e.g., an object being manipulated). In yet another embodiment, a SIFT algorithm may be used to generate scale-invariant feature transform (SIFT) keypoints for the mask proposals for the object to determine the position of the new object.

The object recognition analysis of image data further identifies a first position and a second position of the object. The first position of the object may be the position at a beginning of a manipulation of the object (or the object's initial position), whereas the second position may be the position of the object at the end of the manipulation (or the object's final position). In some embodiments, the image data may include intermediate positions of the object between the first and the second position. In some embodiments, the SIFT keypoints are used to determine the first, second, and any intermediate positions of the first object by comparing the SIFT keypoints detected in a plurality of consecutive images.

Next, a characterization of the manipulation of the object may be generated. The characterization of the manipulation is encoded in the image data in association with the object and its starting (i.e., first position) and ending (i.e., second position) positions. In some embodiments, a characterization of the manipulation of the object is based on translation and rotation parameters associated with repositioning of the object from the first position to the second position. The translation and rotation parameters may be calculated using SIFT keypoint algorithm and/or a volume matching technique. A position and orientation of the first object at each of the positions may be encoded in the characterization of the manipulation in association with the first object.

In some embodiments, the image data includes a plurality of visual images. The image data may be used to generate a three dimensional map of the robot's environment. The map may be created by combining one or more images. In some embodiments, the visual images and/or the generated map may be semantically segmented to generate semantic images/maps with entities classified as representations (e.g., walls, large furniture, surface, human, and the like.).

In some embodiments, the method may further include detecting and encoding positions of one or more human appendages (e.g., hands, fingers, digits, and the like) when the human appendages are manipulating the object. A convolutional neural network (CNN) may be used to detect human body parts in images. The positions may be encoded in the corresponding image data. The positions of the human appendages may be used to identify the first object based on the object's proximity to the human appendages.

The method disclosed herein also includes generating a policy based on iteratively increasing a cumulative award for each subsequent iteration. The value of the cumulative award is based on a summation of earned rewards (including intermediate rewards and a final reward) during a performance recreation iteration (e.g., an iteration of object manipulation). Once an iteration of performance recreation is completed, a cumulative award can be calculated and evaluated against previously earned cumulative awards. The policy can be updated based on the cumulative award evaluation to maximize, or at least increase, subsequently earned cumulative awards. The method may employ and/or implement the policy to provide the robot with further guidance for (e.g., control) subsequent performance recreation iterations to increase the cumulative award. It should be noted that the terms "reward" and "award" may be used interchangeably throughout.

Briefly, a policy may include one or more rules, conditions, algorithms, models, functions, and/or heuristics that are employed to determine which path to take to translate an object from a first position to a second position for a specific iteration. A policy may be a deterministic or statistical/stochastic policy. The policy is determined such that the cumulative award is maximized, or at least increased at each iteration.

In some embodiments, the policy may include, or at least be implemented via, computer instructions or software routines for generating performance recreation. As discussed throughout, the determining of a policy may employ machine learning or other statistical measures to determine aspects of performance recreation, or specific rules or logic for performance recreation. In some embodiments, machine learning, such as reinforcement learning (RL), may be employed to determine the policy based on the feedback events and corresponding previous cumulative awards.

In some embodiments, a method may include determining a current cumulative award associated with a current policy where the current cumulative award is the result of a performed iteration using the current policy. A comparison between the current cumulative award value and previous cumulative award values may be generated. If the comparison is favorable for the current cumulative award (i.e., if the cumulative award is higher than previous cumulative awards), an updated cumulative value of the updated recommendation policy may be generated. If the comparison is favorable for the updated recommendation policy, the updated recommendation policy may be deployed in a "live" online system.

Definitions

Having briefly described an overview of the aspects of the present invention, various terms used throughout this description are provided. Although more details regarding various terms are provided throughout this description, general descriptions of some terms are included below to provide a clearer understanding of the ideas disclosed herein.

Performance Recreation—as used herein, the term "performance recreation" generally refers to the recreation of an observed demonstration performed by a human. Performance recreation may include observing human manipulation of an object from a first position to a second position and recreating that manipulation. By way of a non-limiting example, performance recreation can include observing a human pour a glass of water, leaning the interactions that comprise pour a glass of water, and recreating the observed actions to pour the glass of water.

Demonstration—as used herein, the term "demonstration" generally refers to any action involving the manipulation of objects that the performance recreation system observes and learns. The manipulations may be performed by one or more humans, but need not be. For example, an artificially intelligent robot may learn to perform a task via observing a demonstration of the task by another robot. By way of a non-limiting example, a demonstration may include a human (or robot) pouring a glass of water of which the performance recreation system observes.

Object—as used herein, the term "object" generally refers to a tangible thing that can be manipulated by a human, or another entity. By way of a non-limiting example, an object can be an empty glass or a pitcher.

Known Object—as used herein, the term "known object" generally refers to an object that is being or has already been tracked by the performance recreation system. A known object may be an object of interest. By way of a non-limiting example, given a demonstration where a human pours water from a pitcher into an empty glass, the known object at the time the human pours the pitcher is the pitcher.

New Object—as used herein, the term "new object" generally refers to a previously unknown or untracked object that comes into contact with a known object or a human. By way of a non-limiting example, given a demonstration where a human pours water from a pitcher into an empty glass, the new object at the time water from the pitcher contacts the empty glass would be the empty glass.

First Position—as used herein, the term "first position" generally refers to the position of an object when it first comes into contact with a known object or a human. That is, the first position of an object may be the object's initial position. By way of a non-limiting example, given a demonstration where a human moves a cup from resting on a table, to resting on coaster on the table, the first position of the cup refers to at least an approximate position where the cup first comes into contact with the human hand. The first position may include location, orientation, or both, of a known object when it first comes into contact with a human.

Second Position—as used herein, the term "second position" generally refers to the position of a known object at the end of an observed demonstration. By way of a non-limiting example, given a demonstration where a human moves a cup from resting on a table, to resting on coaster on the table, the second position of the cup refers to at least an approximate position of the cup on the coaster. Second position may include location, orientation, or both, of a known object at the end of the observed demonstration.

Intermediate Position—as used herein, the term "intermediate position" generally refers to the position of a known object during a demonstration between a first and a second position. By way of a non-limiting example, given a demonstration where a human moves a cup from resting on a table, to resting on a coaster on the table, the intermediate position of the cup refers any position between the cup resting on the table and the cup resting the coaster. Intermediate position may include location, orientation, or both, of a known object while being manipulated from the first to the second position.

Visual Image—as used herein, the term "visual image," may refer to a 2D or 3D image, where the pixel values encode visual features (i.e., visual representations of tangible objects). Such encoded visual features within visual images include but are not limited to edges, surface textures, geometric shapes, colors, hues, lighting effects, and the likes. The visual features and/or visual representations may correspond to the tangible entities in the environment. The visual image data encoding visual images may be generated via various imagers or sensors that detect electromagnetic (EM) waves or photons of various frequencies (or wavelengths). Imaging devices that may generate visual images include, but are not limited to cameras that detect visual wavelengths, infrared (IR) cameras, ultraviolet (UV) cameras, radio-frequency (RF) detectors, microwave detectors, and the like. Such imaging devices may include light detection and ranging (LIDAR) cameras, time-of-flight (TOF) cameras, or other laser-scanning-based cameras. Other imaging devices that generate visual images may include stereoscopic cameras, 3D cameras, and the like. Any devices that may generate visual image data encoding a visual image may be collected referred to as "visual image imagers," "visual image cameras," "visual image detectors," and/or "visual image sensors." In various embodiments, the pixel values of a visual image encode information about the detected wave's/photon's intensity, amplitude, frequency, wavelength, polarization, and/or phase. That is, the pixel values of visual images encode various detected aspects waves/photons received from (i.e., reflected from or emitted by) tangible objects in the environment. The pixel values of visual images may be encoded in a red-green-blue (RGB) format, a greyscale format, or any other such format. The term "visual map" may refer to a visual image that is a map. That is, a visual map is a visual image that is associated with a coordinate system. Thus, visual images and visual maps may be referred to as being represented in a visual-domain.

Image Data—as used herein, the term "image data" generally refers to any digital data that encodes data and/or information associated with a visual image. Image data may include color data and depth data of the surrounding environment. The surrounding environment may include objects, both known and new, walls, ceilings, floors, furniture, and the like.

Localization—as used herein, the term "localization" generally refers to determining and/or generating location information associated with an observed demonstration. Localization may include the mapping of various entities within an environment during the observed demonstration. For example, localization may include mapping the position of a human performing an observed demonstration with reference to other entities in the environment.

Cumulative Award (or Cumulative Reward)—a used herein, the terms "cumulative award" of "cumulative reward" may be used interchangeably to generally refer to the sum of all awards (or rewards) earned during the recreation of an observed demonstration. Each of the intermediate positions as well as the second position have has an associated award. The awards associated with the intermediate positions are weighted less than the award associated with the second position. An award associated with each intermediate position may be an intermediate position award. An award associated with a second and/or end position may be a second and/or end position award. The performance recreation system iteratively performs the observed demonstration with the goal of optimizing the cumulative award at each subsequent iteration.

Example Performance Recreation Environment

Referring now to FIG. 1, an exemplary performance recreation system suitable for use in implementing embodiments of the present invention is shown. Generally, performance recreation system 100 is suitable for the recreation of observed human performance (e.g., the recreation of an observed object manipulation). Among other components not shown, performance recreation system 100 includes performance recreation manager (PRM) 102, enhanced robot 104, mechanical gripper 116, data store 106, server 110, user device 118, and photon detector 120. PRM 102 is responsible for recreating demonstrated actions observed by enhanced obot 104 via the various embodiments described herein. Enhanced robot 104 may be enabled to navigate over at least flat surfaces. Robot 104 may include mechanical gripper 116. Mechanical gripper 116 may be implemented by robot 104 to recreate an observed demonstration. Robot 104 may also include an imaging system that is enabled to capture images or videos of robot's 104 environment, such as photon detector 120. The imaging system of robot 104 may include any combination of one or more imaging devices, such as photon detector 120. Imaging devices that may generate visual images include, but are not limited to, cameras that detect visual wavelengths, infrared (IR) cameras, ultraviolet (UV) cameras, radio-frequency (RF) detectors, microwave detectors, and the like. Such imaging devices may include light detection and ranging (LIDAR) cameras, time-of-flight (TOF) cameras, or other laser-scanning-based cameras. Other imaging devices that generate visual images may include stereoscopic cameras, 3D cameras, and the like. Any devices that may generate visual image data encoding a visual image may be collected referred to as "visual image imagers," "visual image cameras," "visual image detectors," and/or "visual image sensors."

PRM 102 may be included in robot 104 or may be a separate computing device located elsewhere. PRM 102 may host and/or implement a demonstration engine (DE) 112 and/or a reinforcement learning engine (RLE) 114. DE 112 is generally responsible for observing and analyzing a demonstrated performance (e.g., object manipulation) observed by robot 104 via the various embodiments discussed herein. RLE 114 is generally responsible for controlling the performance recreation of the demonstrated performance observed by robot 104 via the various embodiments discussed herein. Various embodiments of computing devices, such as, but not limited to, PRM 102, robot 104, and server 110, user device 118, and photon detector 120 are discussed in conjunction with computing device 900 of FIG. 9. In this regard, the components of PRM 102 may be embodied as a set of compiled or interpretted computer instructions or functions, program modules, computer software services, or an arrangement of processes carried out on one or more computer systems.

A general or specific communication network, such as but not limited to communication network 108, may communicatively couple at least a portion of computing devices, such as 102, 104, 110, 118, 120, and one or more databases, including but not limited to data store 106. Communication network 108 may be any communication network, including virtually any wired and/or wireless communication technologies, wired and/or wireless communication protocols, and the like. Communication network 108 may be virtually any communication network that communicatively couples a plurality of computing devices and storage devices in such a way as to allow computing devices to exchange information.

Data store 106 may be implemented by a storage device that may include volatile and non-volatile storage of digital data. A storage device may include non-transitory storage media. Communication network 108 may communicatively couple data store 106, or any other storage device, to at least a portion of computing devices 102, 104, 110, 118, and 120. In some embodiments, data store 106 may be stored on a storage device distributed over multiple physical storage devices. Thus, data store 106 may be implemented on a virtualized storage device. For instance, one or more "cloud storage" services and/or service providers may provide, implement, and/or enable data store 106. A third party may provide such cloud services.

Demonstration Engine

Various embodiments of a demonstration engine (DE), such as, but not limited to, DE 112 of FIG. 1 will now be discussed. As indicated, DE 112 is generally responsible for observing and deconstructing a demonstrated performance observed by robot 104 via the various embodiments discussed herein. At least a portion of the demonstrated performance is observed and deconstructed using visual images provided via one or more visual cameras included in the imaging system of robot 104.

Figure 2:
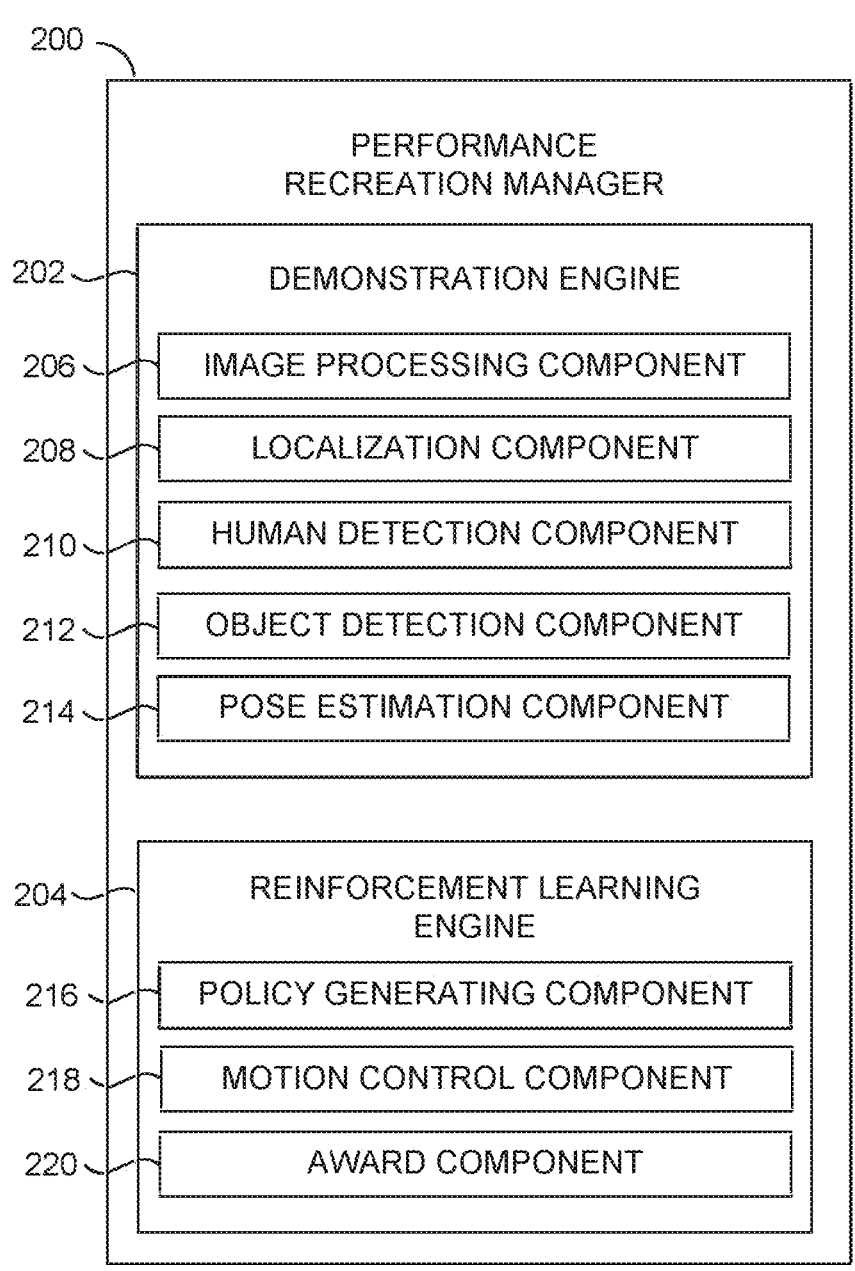
FIG. 2 illustrates a performance recreation manager implementing various embodiments presented herein.

An exemplary demonstration engine is provided in PRM 200 of FIG. 2. In some embodiments, DE 202 of FIG. 2 may include an image processing component 206, a localization component 208, a human detection component 210, an object detection component 212, and a pose estimation component 214. Image processing component 206 is generally responsible for capturing and/or receiving the visual images. Image processing component 206 may capture and/or receive at least a portion of these images via visual one or more visual cameras, such as but not limited to visual cameras of robot 104 (such as photon detector 120 of FIG. 1). Image processing component 206 may process such images in real-time. Image processing component 206 may apply any digital processing techniques and/or methods required on the visual images. For example, the received visual images may be up-sampled, down-sampled, color-corrected, cropped, normalized, filtered, convolved, layered, combined, composited, or virtually any other such imaging processing action. Image processing component 206 may combine and/or stitch together multiple images to generate a larger view of the environment than a single image could encode. Image processing component 206 may associate a coordinate system with each visual image. Image processing component 206 may associate depth and color information with each visual image. Image processing component 206 may correct and/or transform some depth-perception information encoded in the visual images. Image processing component 206 may provide visual images encoded in visual image data structured via pixel values (stored in 1D, 2D, or 3D pixel arrays) to a localization component, such as but not limited to localization component 208 of FIG. 2.

Localization component 208 is generally responsible for generating a map of the environment of robot 104. The localization component 208 employs the visual images captured and processed by the image processing component 206 to determine a real-time localization of the robot 104 and the generating a map of the environment of the robot 104. Localization component 208 may semantically segment the visual images of the robot's 104 environment received from the image processing component 208 to generate semantic images of the environment. Localization component 208 may include a deep learned convolutional neural network (CNN) that is trained to semantically segment visual images. A CNN or a fully convolutional network (FCN) architecture may be trained to semantically segment visual images via various supervised learning methods. The neural network may be trained using a large image dataset. A resulting semantic image may include semantic representations, in semantic-domain, that correspond to visual-domain representations of the corresponding visual image, including semantically labeled or classified floors, walls, ceilings, large furniture, etc. Localization component 208 may generate a semantic map of the robot's 104 environment by combining multiple semantic images. In some embodiments, localization component 208 may combine visual images to generate a visual map. The visual map may then be semantically segmented to generate a semantic map of robot's 104 environment. The semantic image/or map may include semantic image data, structured via pixel values (stored in 1D, 2D, or 3D pixel arrays) include position information for each labeled entity.

Localization component 208 may use distance and normal direction of walls (or other surfaces of objects) in a visual image to generate a map of the environment of robot's 104 environment. The semantic map may include distance and direction information associated with each entity (e.g., floor, wall, ceiling, large furniture, etc.) identified and classified in the semantic map. Localization component 208 may also use the distance and direction information associated with the entities to determine a current position of robot 104 against the known semantic map. In some embodiments, localization component 208 may enable robot 104 to navigate to any desired position using the semantic map of robot's 104 environment as a guide. Localization component 208 stores the semantic map and current position of robot 104 in a data store, such as but not limited to data store 106 of FIG. 1. Localization component 208 may provide semantic map and current position of robot 104 to a human detection component, such as but not limited to human detection component 210 of FIG. 2.

Human detection component 210 may receive semantic map and/or semantic images from localization component, such as but not limited to localization component 208 of FIG. 2. In some embodiments, human detection component 210 may receive visual images from an image processing component, such as but not limited to image processing component 206 of FIG. 2. Human detection component 210 is generally configured to detect and track the position of fingers of both hands of a human. Human detection component 210 is configured to detect human body key points in received images or maps. Human detection component 210 detects a human body or part of a human body in one or more images or maps. For each image or map, human body key points are detected for the human body or part of the human body detected. In accordance with implementations of the present disclosure, human body key points may be detected using a neural network detection model. In embodiments, detected human body key points may comprise up to any of the left/right eye, the left/right ear, the nose neck, the left/right shoulder, the left/right elbow, the left/right wrist, the left/right hip, the left/right knee, the left/right ankle, left/right hand, fingers of left/right hand, etc.

Human detection component 210 is configured to detect human body key points using any neural network model capable of such detection. One such neural network model that can be used is Part Affinity Fields, a model that may be utilized to associate body parts with individual human bodies in an image. Part Affinity Fields uses a set of two-dimensional (2D) vector fields that encode the location and orientation of human limbs in an image. Some other models can use top-down parts detection approaches utilizing, for example, k-poselets, stacked hourglass networks, convolutional networks, deep neural networks, multi-source deep learning, convolutional part heatmap regression, etc. Other models can include bottom-up parts detection approaches that use, for example, ResNet, image-dependent pairwise scores, etc. Additionally, human detection component 210 may utilize any other neural network not listed above to detect human body key points within the scope of embodiments hereof.

Further, human detection component 210 is configured to detect and store in a data store (e.g., data store 106 of FIG. 1) position of each finger of the human in all subsequent visual images, visual maps, semantic images and/or semantic maps once the human is detected in one image. Human detection component 210 tracks positions of fingers of each hand of the human in each of the subsequent images or maps. The neural network may be utilized for each image or map and subsequent position of the fingers may be detected and stored for each. The positions of each of the fingers with respect to time may be saved in a data store, such as but not limited to data store 106 of FIG. 1. Human detection component 210 may store the position data for human hand and fingers in association with pixels of the corresponding image or map in image data. Human detection component 210 may provide the position information for each hand and each finger with respect to time to an object detection component, such as but not limited to object detection component 212 of FIG. 2. In some embodiments, human detection component 210 may provide images and/or maps with pixel values (structured via pixel values stored in 1D, 2D, or 3D pixel arrays) encoded with position information for each human hand and finger detected to an object detection component 212, such as but not limited to Object detection component 212 of FIG. 2.

Although the above discussion of human detection component 210 is directed towards detecting humans, it should be understood that in other embodiments, human detection component 210 may be replaced via a more generalized detection component that is enabled to or configured to detect and track the position of the appendages or members of other entities that may manipulate one or more objects. Such entities may include but are not limited to animals or other robots. For example, demonstration engine 202 may include robot detection component, such that the enhanced robots discussed herein may observe another robot performing a task. In such embodiments, the enhanced robot may learn (via the methods discussed in conjunction with reinforcement learning engine 204) to recreate the other robot's performance of the task. Similarly, demonstration engine 202 may include an animal detection component, such that the enhanced robots discussed herein may observe an animal performing a task (e.g., locomotion, jumping over a barrier, crawling over a surface, and the like). In such embodiments, the enhanced robot may learn (via the methods discussed in conjunction with reinforcement learning engine 204) to recreate the animal's performance of the task. For example, the enhanced robot may learn to emulate the biomechanics of the animal. As such, such a robot or animal detection component may include similar functionalities to that of human detection component 210, but be directed to the detection or robots or animals.

Object detection component 212 is generally configured to detect and track objects being manipulated within a robot's environment. Object detection component 212 may receive data from a human detection component (or a robot or animal detection component), such as but not limited to human detection component 210 of FIG. 2. In some embodiments, object detection component 212 may receive visual and/or semantic images and/or maps from an image processing component, such as but not limited to image processing component 206 of FIG. 2, or a localization component, such as but not limited to, localization component 208 of FIG. 2. Object detection component 212 may be configured to use one or more techniques to detect a new object to track. A new object generally refers to a previously unknown or untracked object that comes into contact with a known object or a human. In some embodiments, object detection component 212 may utilize a convolutional neural network (CNN) to detect new objects using image data from one or more image and/or maps.

Object detection component 212 is configured to detect a new object. Object detection component 212 may generate an optical flow of an image with respect to a subsequent image. It may perform a pixel-by-pixel comparison of the image data of the two consequent images. Object detection component 212 recognizes the human body/human body parts detected by a human detection component, such as but not limited to human detection component 210. When performing a pixel-by-pixel comparison, object detection component 212 may ignore the pixels associated with the human body/human body parts. All other pixels with non-zero optical flow may be detected. The pixels with non-zero optical flow are pixels that have moved in space from one image to the next.

Next, optical detection component 212 may detect connecting pixels. A non-zero optical flow pixel is considered connected to another non-zero optical flow pixel based on proximity. In some embodiments, a pixel is connected to another pixel if the other pixel is one of eight adjacent pixels to the pixel. Optical detection component 212 may detect a group of connected pixels showing optical flow in consequent images. The connected pixels can be considered a patch demonstrating optical flow. Further, optical detection component 212 may detect more than one patch with optical flow. In some embodiments, optical detection component 212 only detect pixels and corresponding patches with optical flow near the a human hands and/or fingers (or corresponding appendages on animals or robots) in the images, the positions of the human hands and/or fingers are received from the image data recorded by a human detection component, such as but not limited to human detection component 210 of FIG. 2. The pixel patches are detected based on the pixel values encoded in the images/maps received from the human detection component 210. The pixel patches near a hand are determined based on distance of the individual pixels and/or the patch from the hand/fingers in terms of number of pixels. In some embodiments, the patches and/or pixels near the hand are determined based on three-dimensional Euclidean distance between the position of the patch and the hand calculated from depth data stored in the image data by an image processing component, such as but not limited to image processing component 206 of FIG. 2. In some embodiments, object detection component 212 may determine each individual pixel patch to be a new object. Object detection component 212 may use any other known method to determine new object through consequent images or maps.

Object detection component 212 may identify new objects using masks and their feature signatures in images or maps. A mask indicates a segment created along boundaries within an image or a map so that the segment designates an entity within the image or map. Such segmentation can be performed using any variety of techniques. Such techniques include deep learning techniques, color range or saliency detection, thresholding, clustering methods, compression-based methods, histogram-based methods, edge detection, dual clustering methods, graph partitioning methods, watershed transformation, model based segmentation, multi-scale segmentation, and semi-automatic segmentation. Specifically, the deep learning techniques can include instance-level semantic segmentation, automatic boundary-aware human cutout, object detection using cascaded neural networks, generic algorithms for segmentation such as regional convolutional neural network (R-CNN) and/or mask R-CNN. As can be appreciated, any number of segments can be identified or detected. For example, in some embodiments, any segments may be identified and ranked, such that only a portion of the identified segments are masked and/or presented. Only masks near a threshold distance from human hands and/or fingers are determined to be potential objects being manipulated, such masks can be characterized as candidate masks by object detection component 212. The features of the masks include semantic classifications determined by a localization component, such as but not limited to localization component 208 of FIG. 2. In some embodiments, the masks near the hand are determined based on three-dimensional Euclidean distance between the position of the patch and the hand calculated from depth data stored in the image data by an image processing component, such as but not limited to image processing component 206 of FIG. 2. The masks along with their feature signatures may be recorded and stored in pixel values of the images/maps in association with the new object by object detection component 212.

In one non-limiting embodiment, the architecture of a neural network is configured and/or adapted to include an object mask module. An existing mask regional convolutional neural network (R-CNN) architecture may be used to generate mask proposals for received images or maps. Mask R-CNN may use an existing Faster R-CNN architecture along with a mask classifier branch. The Mask R-CNN architecture takes as input an image or map, and generates an output image or map with masks for entities. It generates one or more bounding boxes around each potential entity identified in the image or map, and as such, generates segments in the image or map. A regression model is used to generate the bounding boxes. For each box, one or more masks are predicted in a pixel-to-pixel manner by the neural network for each segment. The neural network may include a region of interest classification branch that may predict mask labels for each potential bounding box. The mask labels may be compared to the semantic segmentation classification label generated by a localization engine, such as but not limited to localization engine 208 of FIG. 2. In some embodiments, any segments may be identified and ranked, such that only a portion of the identified segments are masked and/or presented. Only masks near a threshold distance from human hands and/or fingers are determined to be potential objects being manipulated, such masks can be characterized as candidate masks by object detection component 212. In some embodiments, the masks near the hand are determined based on three-dimensional Euclidean distance between the position of the patch and the hand calculated from depth data stored in the image data by an image processing component, such as but not limited to image processing component 206 of FIG. 2.

In one embodiment, object detection component 212 may compare pixel patches to the candidate masks. If a mask proposal has more than a threshold overlap (e.g., 33%, etc.) with a detected pixel patch with optimal flow, then the pixel patch is considered a new object. The overlap may be calculated using the ratio of common pixels present in both the mask and the patch to the total number of pixels (i.e., number of pixels in mask plus number of pixels in the patch minus the number of common pixels present in both). In some embodiments, multiple masks match a pixel patch. In such a case, the mask with maximum overlap with the patch with optimal flow may be considered a new object.

New objects are instantiated as tracked objects by object detection component 212. The objects are then tracked within the images with respect to time. The object's manipulation is associated with the hand and/or fingers is stored in the image data in a data store, such as but not limited to data store 106 of FIG. 1. The candidate mask and corresponding feature signature associated with the mask for the new object is also recorded and stored in the data store in association with the new object.

Object detection component 212 may also be configured to determine scale invariant feature transform (SIFT) key-points for the new object's mask using a SIFT algorithm. SIFT keypoints are one or more points of interest within an image/map that identify one or more feature of the image. The mask may be processed with Gaussian filters at different scales to allow a difference of successive Gaussian-blurred images of the original mask to be taken. Points of interest are then taken as maximum and minimum of the Difference of Gaussian (DoG) that occurs at multiple scales. A point of interest or SIFT key point may then be identified as the local maximum/minimum of DoG image across the scales. To accomplish this, each pixel of the mask may be compared in the DoG image to the closest eight neighbors as the same scale and nine corresponding neighbors in each of the neighboring scales. If the pixel value is the maximum or minimum among all compared pixels, that pixel may be identified as a candidate point of interest or candidate SIFT keypoint. A candidate SIFT keypoint may be a SIFT key-point for purposes of an embodiment of the present invention, or a candidate SIFT keypoint may be just that, a candidate. A candidate SIFT keypoint may then be subjected to one or more refinement processes to reject the candidate keypoints for one or more reasons. Object detection component 212 may generate SIFT keypoints for pixels in the mask and store them as image data in the data store in association with the new object.

Further, object detection component 212 is configured to track the known objects based on image data. Image data for each image or map including the new object is accessed. Image data includes masks and corresponding feature signatures for the objects for each image or map. A new object becomes a known object once it begins being tracked. A known object generally refers to an object that is being or has already been tracked by the performance recreation system. For each new image/map, known objects are identified. This may be done by matching masks of known objects in consecutive images/maps. The feature signatures in the current, real-time image/map are compared with prior feature signatures stored in image data for the known object in previous images/maps. The cosine distance between the signature vector of the feature signatures in current image is compared to feature signature vectors in each image/map from previous images/maps is used as the comparison matrix. The distance is determined based on distance of the individual pixels. In some embodiments, the distance based on 3D Euclidean distance between the vectors, such as but not limited to image processing component 206 of FIG. 2. The top matches (e.g., 16) with distance less than a threshold distance are determined. The top matches are given a score.

Object detection component 212 is further configured to determine corresponding mask and SIFT keypoints for future matching. The mask position in the current image/map may be calculated using optical flow of pixels in the new object's mask. The optical flow from the previous image/map may be used to calculate potential positions of the pixels in the mask of the known object in the current image/map. If the mask pixels of one or more of the top matches have overlap of a threshold (e.g., 50%) number of pixels with the potential positions of the pixels from optical flow, the scores those one or more of the top matches are increased by a set increment. This is based on the assumption that the pixels of the new object move together. Next, SIFT keypoints are calculated for each of the top matches using an algorithm similar to the SIFT algorithm described above. The SIFT keypoints for the top matches may then be matched against the SIFT keypoints of the known object's mask determined in the previous image. For each top match, if more than one SIFT keypoint is matched; the score for that top match is increased by a set increment. The top matches may then be sorted from the one with the highest score to the lowest score. The highest match may be selected as the mask for the new object in the current image/map and the SIFT keypoints associated with the highest match are recorded and stored in the image data for the current image.

In some embodiments, object detection component 212 may also be configured to eliminate spurious objects. A new object or a known object may be eliminated from tracked objects. An object may be considered a spurious object if the mask for the known object does not show non-zero optical flow for at least half of a threshold number of consecutive images/maps. A new or known object may be misidentified as an object being manipulated if it is close to another new or know object being manipulated. For example, when a hand passes close to other objects before reaching its intended object. A mistaken flow may have been identified for the other objects using optical flow or mask analysis. However, once the intended object is moved, the mistakenly labeled object will not show any more non-zero optical flow. At that point, the spurious object may be identified and eliminated from tracked or known objects.

In some embodiments, object detection component 212 is further configured to identify support objects. Support objects are objects that come into contact with a known or new object but do not undergo any motion or manipulation. Support objects are instantiated when the first image shows the support object come into contact with a known or new object. The spurious objects may be identified by determining a best mask proposal for the first image/map where the support object comes into contact with a new or known object, the best mask proposal with the highest overlap with the pixels around the known object in the image/map and in contact with the known object. The mask of the support object may be saved in pixel value in image data.

Referring back to FIG. 2, pose estimation component 214 is generally configured to determine 3D characteristics (i.e., position and/or orientation) of objects (new and/or known). When a new object is first identified in an image/map, a volume representation around the new object is instantiated. Pose estimation component 214 receives image data with a new object from an object detection component, such as but not limited to object detection component 212 of FIG. 2. The position of the object in the first image/map it is encountered in is recorded as the first position of the object in the image data. The first position is considered the beginning position or the zero position. All subsequent positions associated with the new object in the subsequent images/maps are identified with respect to the first position. The voxels in the volume occupied by the visible surface of the object in the first image/map are identified.

When the object is manipulated to a second position in a subsequent image/map, pose estimation component 214 calculates the translation and rotation parameters for the motion of the object with respect to the first position of the object. An inverse translation and rotation may be applied to the object in the subsequent frame to, essentially, bring back the visible surface of the object in the subsequent image/map to the instantiated volume of the first object in the first image/map. The corresponding voxels in the volume are recorded with respect to the second position of the object. This can be repeated across the images/maps. In some embodiments, the positions and orientations of an object across images/maps may be tracked and recorded in terms of translations and rotations of the object with respect to the volume instantiated in the first image/frame where the object is instantiated. The tracked positions, translations and rotations of the object may be stored in association with the particular tracked object in a data store, such as but not limited to data store 106 of FIG. 1. In some embodiment, pose estimation component 104 may also be configured to identify parts of interest of an object. The parts of interest may be identified in terms of the voxel position of the part of interest in the volume. Keeping track of the translation and rotation parameters helps develop a full picture of the object since different portions of the object may be visible in different images/maps based on individual viewing angle presented in each image/map.

In some embodiments, pose estimation component 214 utilizes SIFT keypoints to calculate translation and rotation parameters for the object in each frame with respect to the object's first position. For each subsequent image/map, a SIFT match may be done of pixels corresponding to the object in the subsequent image/map against that of the pixels of the same object in each of the earlier images/maps. Any known algorithm (e.g., Kabsch algorithm) may be used to calculate the position of the object in each subsequent image/map. A rotation matrix may be computed for the pixels matched. A new position of the object is calculated for each subsequent image/frame using the positions of matched pixels of the object in the image/map with the pixels in the earlier images/maps.

In some other embodiments, pose estimation component 214 may use a volume matching mechanism to determine the translation and rotation parameters for the object in each frame with respect to the object's first position. At the first image/map where the object is first identified, a volume of voxels is instantiated around the visible surface of the object. The positions of each pixels corresponding to the first frame are marked as a zero position or first position. All the other voxels in the image/map are identified based on their distance from the visible surface of the object. The position of the object in the subsequent image/map is compared against the instantiated volume to find an orientation that may align the surfaces of the object in the first image/map and the second image/map. An energy value may be calculated for each pixel in the subsequent image/map. The energy value may be based on the distance value (distance from the voxel in the first image/map) of the voxel in the volume where the three dimensional position of the pixel falls. In some embodiments, a few rounds of optimization may be performed to determine a more accurate orientation estimate that reduces the overall energy value, more closely aligning the surfaces of the object in the images/maps. It should be noted that since the first and second order gradients with respect to the direction can be calculated for each voxel in volume, the second order of optimization method may be utilized to improve the orientation estimate. A new position of the object is calculated and recorded for each subsequent image/frame using the volume matching mechanism in the image data in association with the particular object manipulated. The image data may be stored in a data store, such as but not limited to the data store 106 of FIG. 1.

The positions, translations, rotation, and orientation parameters in association with the tracked object may be provided in the form of image data to a reinforcement learning engine, such as but not limited to RLE 114 of FIG. 1 or RLE 200 of FIG. 2. Further, the mask proposals for the tracked objects and associated signature vectors for each respective image observed may be provided in the form of image data to a reinforcement learning engine, such as but not limited to RLE 114 of FIG. 1 or RLE 200 of FIG. 2.

Reinforcement Learning Engine

Various embodiments of a reinforcement learning engine (RLE), such as, but not limited to, RLE 114 of FIG. 1 will now be discussed. As indicated, RLE 114 is generally responsible for controlling the performance recreation of the demonstrated performance (i.e., observed manipulation of an object) observed by robot 104 based on the maximization, or at least the increase, of a cumulative award during each iteration of performance recreation, as discussed in various embodiments herein.

An exemplary RLE is provided in PRM 200 of FIG. 2. In some embodiments, RLE 200 of FIG. 2 may include policy generating component 216, motion control component 218, and award component 220. Policy generating component 216 is generally responsible for generating (or determining) and updating one or more policies based on a cumulative award (e.g., sum of all awards earned during each temporal step of each iteration of performance recreation). Motion control component 218 is generally responsible for guiding the mechanical gripper through iterations of performance recreation based on a generated policy. Award component 220 is generally configured to calculate the cumulative award earned for each iteration of performance recreation and evaluate the calculated cumulative award against previous cumulative awards from previous performance recreation iterations.

As described above, policy generating component 216 is generally responsible for generating (or determining) and updating one or more policies (e.g., trajectory plan) based on a cumulative award (e.g., the sum of all awards earned during each temporal step of an iteration of performance recreation). Essentially, reinforcement learning is utilized such that robot 104 may learn how to better perform an observed task while simultaneously performing the task. As is typical in RL frameworks, the state of robot 104 within a given environment is modeled as an N-dimensional state space, where a state within the space is indicated by S. In embodiments where N>1, S may be an N-dimensional vector quantity. At each location S, robot 104 is enabled to execute one or more actions. The one or more actions may include actions to recreate an observed demonstration (e.g., perform an observed task). A function that deterministically or statistically maps, or selects, one of the available actions to the state S is referred to as a policy. In various embodiments, the policies are deterministic. However, in other embodiments, the policies may be statistical and/or stochastic mappings.

At the onset, policy generating component 216 of robot 104 performs an object recognition analysis of image data to identify one or more previously tracked objects in an environment. In some embodiments, robot 104 may be in the same environment as during the demonstration observation. In other embodiments, robot 104 may be in a different environment than during the demonstration observation. Policy generating component 216 may use one or more of the above described object detection methods in relation to the object detection component 212 of FIG. 2 to generate mask proposals for objects in its current environment. Policy generating component 216 compares the signatures of the mask proposals of the current environment to the signatures of mask proposals of the previously tracked objects to determine an object to be manipulated. Signatures of mask proposals of the previously tracked objects may be received in the form of image data from a demonstration engine, such as but not limited to demonstration engine 202 of FIG. 2. In some embodiments, signatures of mask proposals of the previously tracked objects may be received in the form of image data from a data store, such as but not limited to data store 106 of FIG. 1. Based on the positions (e.g., locations, orientations, etc.) of the objects to be manipulated, policy generating component 216 generates a policy to manipulate the objects to adhere to the observed demonstration.

To generate a policy that controls performance recreation, policy generating component 216 assigns an award to each intermediate position and a second position (e.g., end position and/or desired position) associated with the task which robot 104 will recreate. As discussed herein, the second position may be the desired and/or end position and/or orientation of the object(s) of interest. The assigned awards are weighted such that each award assigned to an intermediate position is less than the award assigned to the second position. At each temporal step during an iteration of performance recreation, robot 104 may earn an award. If and/or when robot 104 reaches the second position (i.e., completes the task), robot 104 may earn the award associated with the second position. Each award also includes the linear time-based wayward positions of a mechanical gripper (such as but not limited to mechanical gripper 116 of FIG. 1) and the object(s) of interest, as well as the final desired position (e.g., second position) of the object(s) of interest. During each iteration of performance recreation, the distance between the first position and the second position is iteratively calculated. As described herein, the sum of all awards earned at each temporal step during an iteration of performance recreation is a cumulative award.

A robot, such as but not limited to robot 104 of FIG. 1, may be trained via iteratively learning a policy that maximizes, or at least increases, a statistically-expected value of the cumulative award over a (finite or infinite) number of temporal steps of a performance recreation iteration, where each execution of an action robot 104 takes (and corresponding award) is associated with a single temporal step of the performance recreation iteration between a first position and a second position. Essentially, training robot 104 includes the determination, generation, and/or update of the policy of robot 104, such that performance recreation actions taken by robot 104 within an environment tend to maximize, or at least increase, the expected value of the cumulative award.

During the training of robot 104, policy generating component 216 iteratively updates a policy, such that the policy "learns" to select actions, based on S, that tend to result in the successful (and more accurate/precise) performance of the performance recreation task by robot 104. Essentially, as robot 104 performs additional performance recreation iterations, policy generating component 216 "learns" from each iteration such that subsequent iteration may result in a maximized, or at least increased, cumulative award. Awards are arranged in terms of the second position (e.g., the desired position and/or orientation). The assigned awards are weighted such that each award assigned to an intermediate position is less than the award assigned to the second position. That is, as the cumulative award increases, the more accurate and precise the performance recreation is. Advantageously, using a weighted award system allows a certain degree of freedom in which robot 104 may operate, that is, a weighted award system enables operational improvising during performance recreation iterations. As can be appreciated, each cumulative award associated with a performance recreation iteration need not be larger in value than any cumulative award associated with a previous performance recreation iteration. In some embodiments, a current cumulative award may be less than at least one subsequent cumulative award. In other embodiments, a current cumulative award may be equal to at least on previous cumulative award. In additional embodiments, a current cumulative award may be great than at least one previous award.

A Reset-Free Guided Policy Search (GPS) may be used in conjunction with generating (e.g., determining) and/or updating a policy. GPS uses trajectory optimization, that is, the process of maximizing (or at least increasing) some measure of performance while satisfying a set of constraints, to direct policy "learning" of neural networks. Traditional GPS requires a consistent set of initial states (e.g., the same first position) to which a system (e.g., performance recreation system 100 of FIG. 1, etc.) must be reset after each iteration (e.g., performance recreation iteration). Reset-Free GPS allows for the use of random initial states (e.g., using different first positions to reach the same second or end position) during a performance recreation iteration. Advantageously, using Reset-Free GPS enables continued policy "learning" even when deterministic resets of performance recreation iterations are impossible or alternatively otherwise unavailable. Additionally, Reset-Free GPS can train high-dimensional neural network policies, such as the policy discusses herein, with the same sample efficiency as prior GPS methods, and can "learn" policies directly from image pixels.

A safe zone may be used in conjunction with a generated policy for collision avoidance purposes during performance recreation. Here, while it is important to ensure reasonable (and oftentimes optimal) system performance (e.g., by a system, such as performance recreation system 100 of FIG. 1), it is also important to ensure safety of the performing agent (e.g., a robot, such as robot 104 of FIG. 1) in the application of RL to various performance recreation tasks. In this regard, collision avoidance of an arm assembly (such as but not limited to arm assembly 400 of FIG. 4A) is accomplished by giving arm assembly 400 a defined safe zone to operate within, where the safe zone is an input state used in the RL framework. In this regard, the awards earnable during each iteration of performance recreation may also be proportional to the negative distance of arm assembly beyond the safe zone boundary. Advantageously, employing a safe zone only aids in the safe exploration during performance recreation, but deviations from the safe zone can negatively impact the cumulative award of an iteration, thereby impacting subsequently generated and/or updated policies.

As described above, motion control component 218 is generally responsible for guiding a mechanical griper, such as but not limited to mechanical gripper 116 of FIG. 1, through iterations of performance recreation based on a generated and/or updated policy. To perform an iteration of performance recreation, robot 104 needs to know (i.e., calculate) the position (and orientation) of the object of interest and the position (and orientation) of the mechanical gripper, such as mechanical gripper 116 of FIG. 1, so that robot 104 can take required action to manipulate the object of interest from first position (or an intermediate position) to a desired end position (e.g., a second position or a second intermediate position). The position calculations may happen in real time, e.g., while the action is being performed. In some embodiments, the position calculations may occur once per second. In other embodiments, calculations may occur at a slower or faster rate. In embodiments where calculations are performed once per second, optical flow does not work on the amount of displacement the object of interest would undergo in one second. However, as discussed above, stored MASK-RCNN signatures and SIFT keypoints are sufficient to detect the object over such displacement. The same or similar scoring mechanism as described herein with regard to tracking moving objects and eliminating spurious objects is used to detect the known object of interest in a frame with no scores calculated for optical flow related mechanisms. In this regard, motion control component 218 may receive a policy from policy generating component 216, and based on that policy, motion control component 218 may guide (e.g., control) robot 104 (and mechanical gripper 116) through an iteration of performance recreation.

While reinforcement learning engine 204 is described herein as both generating the policy and also controlling the movement of mechanical gripper 116 to conform to the generated policy, it should be appreciated that a non-neural-network-based component may be used, instead of motion control component 218, to control the movement of mechanical gripper 116 (e.g., move mechanical gripper 116 into positions determined by policy generating component 216) by outputting the desired motor commands. By way of nonlimitng example, a non-neural-network-based component may be able to access a data store, such as data store 106 of FIG. 1 that stores all possible joint angles and corresponding gripper positions for each arm assembly of robot 104, and use that information to assist in controlling the movement of mechanical gripper 116. In some embodiments, data store 106 of FIG. 1 may contain exact angle of each joint and the length of the segments between the joints of the respective arm assemblies. In some embodiments, non-neural-network-based component may store this information and not need to access a data store, such as data store 106 of FIG. 1. In even further embodiments, the non-neural-network-based component may determine the position of the gripper at any given time using forward kinematics. Any known method of calculating kinematics, such as but not limited to the Denavit-Hartbenber Convention may be used.

The non-neural-network-based component to control an arm assembly, such as arm assembly 400, may use a sequence of small increments of joint motion and joint angles to arrive at the final desired configuration to fulfil the generated policy from policy generation component 216. At each increment, valid configurations are determined to avoid collision with the environment. In some embodiments, the arm assembly, such as arm assembly 400, may not have reached the exact final desired configuration. In such a scenario, a photon detector, such as photon detector 120 of FIG. 1 may be used to determine the delta difference between the current positon of the arm assembly (and its respective associated joints) and the final desired configuration. In embodiments, the arm assembly joints may include magnetic encoders which may be used to determine the current joint positions. A data store, such as data store 106 of FIG. 1, may be consulted to determine the required movement from the current positon in order to traverse the calculated delta difference to arrive at the final desired configuration (e.g., position). It should be appreciated that one, or more than one, iterations may be required for the arm assembly (and its respective associated joints) to arrive at the final desired configuration.

As described above, award component 220 is generally configured to calculate a cumulative award earned for each iteration of performance recreation. During each iteration of performance recreation, robot 104 may earn awards associated with intermediate positions and a second position (e.g., end position and/or desired position). In this regard, reward component 220 is configured to calculate the cumulative awards earned by robot 104 during performance recreation iterations by adding summing the total awards earned in a given iteration. For example, if a robot earned 100 intermediate awards, each award valuing 1 point and each associated with the same weight, but failed to reach the second position, award component 220 may calculate the total awards earned, and determine the cumulative award to equal 100 points. In yet another example, if a robot earned 88 intermediate points, each award valuing 1 point and each associated with the same weight, but reached the second position with an award value of 50 points, award component 220 may calculate the total awards earned, and determine the cumulative award equaling 138 points.

Award component 220 is further responsible for evaluating the earned cumulative award of a determined policy, in comparison to other determined policies, such as those policies used to control other (e.g., previous) iterations of performance recreation (e.g., object manipulation from a first position to a second position). That is to say, award component 220 enables a workflow to evaluate a cumulative award of a current policy, and evaluate the performance of the updated policy, as compared to the current policy and any previously generated policy, prior motion control component 218 deploying the updated policy to control a subsequent iteration of performance recreation. Essentially, award component 220 may determine a current cumulative award associated with a current policy where the current cumulative award is the result of a performed iteration using the current policy. Award component 220 may compare the current cumulative award value and previous cumulative award values. If the comparison is favorable for the current cumulative award (i.e., if the cumulative award is higher than previous cumulative awards), an updated cumulative value of the updated recommendation policy may be generated. If the comparison is favorable for the updated recommendation policy, the updated recommendation policy may be deployed in a "live" online system.

Referring now generally to FIG. 2, although illustrated as separate components of the PRM 200, any number of components can be used to perform the functionality described herein. Further, although illustrated as being a part of a PRM, the components can be distributed via any number of devices. By way of non-limiting example, an input processing component can be provided via one device (e.g., a user device, such as user device 118 of FIG. 1), server (e.g., a server, such as server 110 of FIG. 1), or cluster of servers, while a candidate image unit generating component can be provided via another device, server, or cluster of servers. The components identified herein are merely set out as examples to simplify or clarify the discussion of functionality. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more components may be carried out by hardware, firmware, and/or software. For instance, various functions may be carried out by a processor executing instructions stored in memory.

As can be appreciated, robot 104 may be capable of observing and recreating various types of object interactions (e.g., performing various tasks, etc.), such as but not limited to moving objects, pressing objects (e.g., pressing a button), turning objects, and the like. These various object interactions can be grouped together based on a common template they adhere to. By way of nonlimitng example, a "motion template" may include various tasks related to moving one or more objects. A "press template," for example, may include the movements for pressing an object or a portion of an object (e.g., starting a smart appliance, or any other Internet of Things-enabled device.). By way of further example, a "press template" may be used to start or stop a microwave to turn on or turn off the appliance. In embodiments, demonstration engine 202 of FIG. 2 may use a CNN to extract text from an object (e.g., a button), or a CNN to recognize key features or symbols on the button to recognize the object or part of the object to push. Robot 104 may be equipped to determine which template to use for a given observed demonstration (e.g., observed object interaction).

Exemplarily Robot and Mechanical Gripper

Various embodiments of an enhanced robot, such as, but not limited to enhanced robot 104 of FIG. 1 and of a mechanical gripper, such as, but not limited to mechanical gripper 116 of FIG. 1 will now be discussed. As indicated, robot 104 is generally configured to observe a demonstration (e.g., a manipulation of a first object from a first position to a second position), and subsequently recreate the observed demonstration using mechanical gripper 116 based at least in part on the combination of machine vision and reinforcement learning according to various embodiments discussed herein.

Figure 3A:
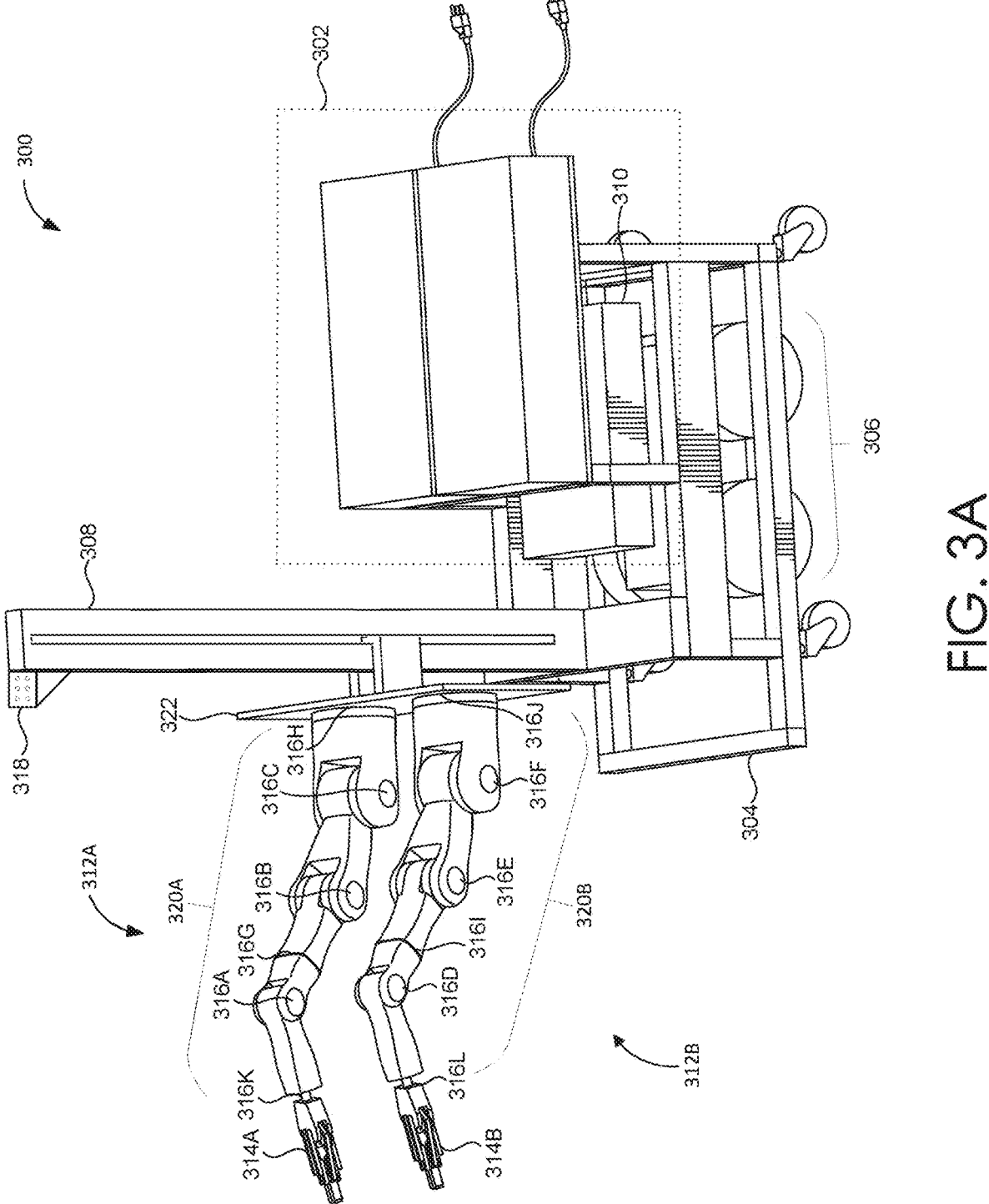
FIG. 3A illustrates an exemplary robot with arm assemblies in a lower vertical position that is consistent with the various embodiments presented herein.
Figure 3B:
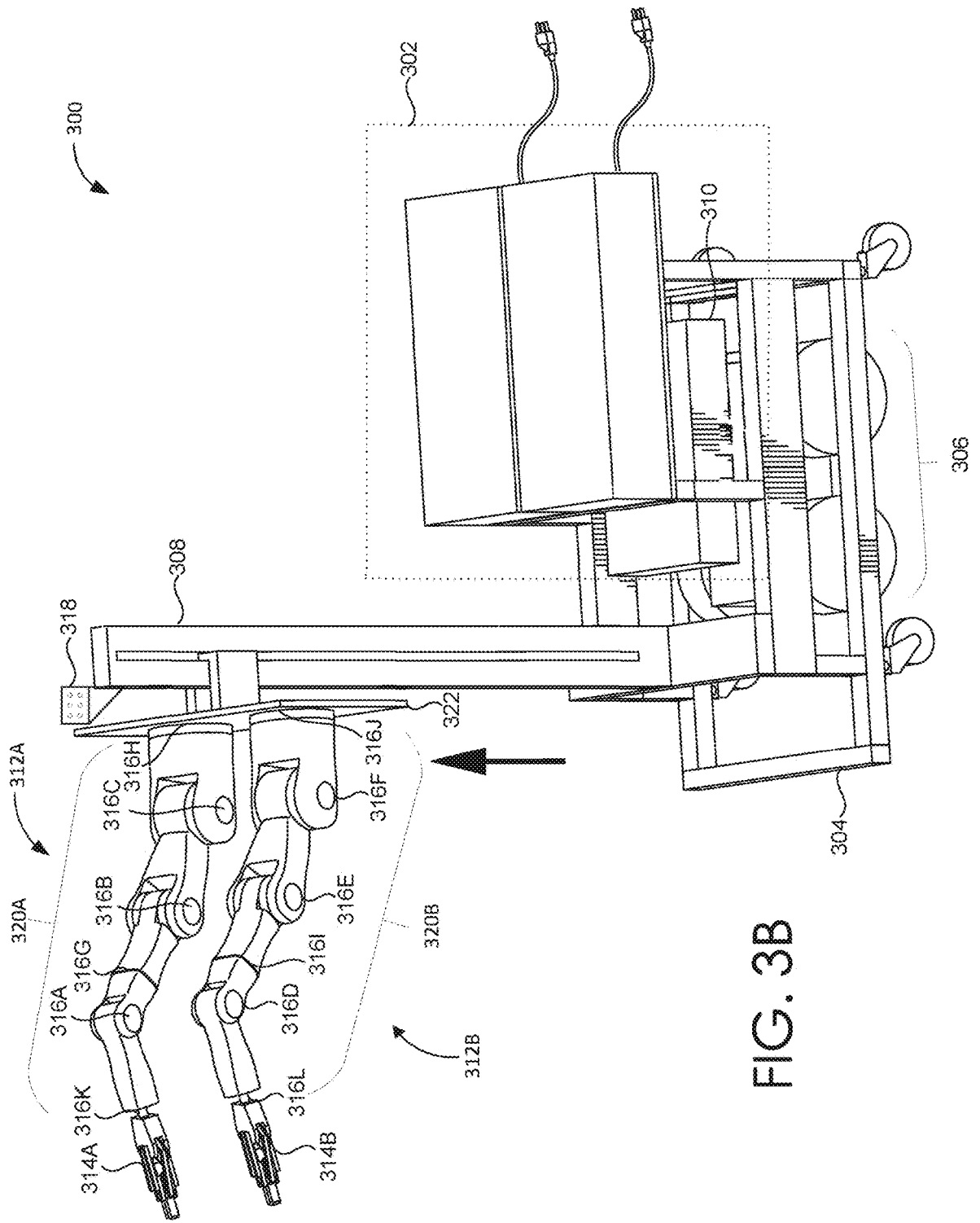
FIG. 3B illustrates another exemplary robot with arm assemblies in an upper vertical position that is consistent with the various embodiments presented herein.

An exemplary robot is provided in FIGS. 3A and 3B. Specifically, FIG. 3A illustrates an exemplary robot with arm assemblies in a lower vertical position that is consistent with various embodiments described herein. As shown in FIG. 3A, enhanced robot 300 includes torso 302, base 304, wheels 306, arm assembly column 308, assembly plate 322, arm assemblies 312A and 312B, mechanical arms 320A and 320B, mechanical grippers 314A and 314B, arm assembly joints 316A through 316L, and photon detector 318. Torso 302 includes circuit board 310. In some embodiments, circuit board 310 may include a performance recreation manager, such as but not limited to PRM 102 of FIG. 1. In other embodiments, circuit board 310 may include any other components required to enable robot 104 to recreate a demonstrated performance (i.e., recreate a manipulation of an object). Base 304 supports robot 300 and is coupled to wheels 306 of robot 300. Wheels 306 enable robot 300 to move freely within an environment. In some embodiments, wheels 306 allow robot 300 to traverse at least flat surfaces. As can be appreciated, wheels 306 may enable robot 300 to traverse various environments, including both indoor and outdoor environments, as well as flat and otherwise non-flat surfaces.

Arm assembly column 308 is coupled to base 304 and torso 302, which includes circuit board 310. Arm assembly column 308 is also moveably coupled to a first side of assembly plate 322. Assembly plate 322 is rotatably coupled via joins (e.g., joints 316H and 316J), on a second side, to a first end of each of arm assemblies 312A and 312B allowing arm assemblies 312A and 312B to move both vertically and rotatably during performance recreation. For example, as illustrated in FIGS. 3A and 3B, arm assemblies 312A and 312B may be capable of moving from a lower vertical position, as seen in FIG. 3A, and to an upper vertical position, as seen in FIG. 3B. As can be appreciated, arm assemblies 312A and 312B may be capable of moving in other directions and rotating various degrees. Arm assemblies 312A and 312B may include mechanical arms 320A and 320B, and mechanical grippers 314A and 314B. Mechanical arms 320A and 320B, are coupled on a first end to arm assembly column 308 and rotatable coupled on a second end to corresponding mechanical grippers 314A and 314B. Mechanical arms 320A and 320B may also include joints such as joints 316A through 316L. In this regard, each mechanical arm 320A and 320B includes six joints. For example, and as illustrated in robot 300, mechanical arm 320A may include joints 316A, 316B, 316C, 316G, 316H, and 316K, and mechanical arm 320B may include joints 316D, 316E, 316F, 316I, 316J, and 316L. Joints 316A through 316L may allow robot 300 to recreate performance iterations (e.g., recreate manipulations of an object). Mechanical grippers 314A and 314B, each rotatably coupled to a second end of arm assemblies 320A and 320B via joints 316K and 316L, respectively, are generally configured to manipulate an object from a first position to a second position based on a generated policy. Mechanical grippers 314A and 314B include additional joints to further assist in performance recreation (e.g., object manipulation.). Each of the arm assemblies 312A and 312B allow for at least seven degrees of freedom of movement for recreating iterations of an observed demonstration. As can be appreciated, along with the at least seven degrees of freedom attained through the above mentioned joints of arm assemblies 312A and 312B, robot 300 is capable of at least ten degrees of freedom via assembly plate 322 capable of moving vertically and wheels 306 capable of moving in two dimensions on a given surface.

Photon detector 318 is generally responsible for generating visual images encoded in image data. Photon detector 318 may be any device that may generate visual image data encoded a visual image. The visual images may include images of a robot's environment, including objects within the environment. Photon detector 318 may generate image data by capturing electromagnetic (EM) waves or photons of various frequencies (or wavelengths). In some embodiments, photon detector 318 may be a stereoscopic camera, a 3D camera, and the like.

Similar to FIG. 3A, FIG. 3B illustrates an exemplary robot with arm assemblies in an upper vertical position that is consistent with various embodiments described herein. As shown in FIG. 3B, robot 300 includes torso 302, base 304, wheels 306, arm assembly column 308, assembly plate 320, arm assemblies 312A and 312B, mechanical grippers 314A and 314B, arm assembly joints 316A through 316F, and photon detector 318. Torso 302 includes circuit board 310. In some embodiments, circuit board 310 may include a performance recreation manager, such as but not limited to PRM 102 of FIG. 1. In other embodiments, circuit board 310 may include any other components required to enable robot 104 to recreate a demonstrated performance (i.e., recreate a manipulation of an object). Base 304 supports robot 300 and is coupled to wheels 306 of robot 300. Wheels 306 enable robot 300 to move freely within an environment. In some embodiments, wheels 306 allow robot 300 to traverse at least flat surfaces. As can be appreciated, wheels 306 may enable robot 300 to traverse various environments, including both indoor and outdoor environments, as well as flat and otherwise non-flat surfaces.

Arm assembly column 308 is coupled to base 304 and torso 302, which includes circuit board 310. Arm assembly column 308 is also moveably coupled to a first side of assembly plate 322. Assembly plate 322 is rotatably coupled via joins (e.g., joints 316H and 316J), on a second side, to a first end of each of arm assemblies 312A and 312B allowing arm assemblies 312A and 312B to move both vertically and rotatably during performance recreation. For example, as illustrated in FIGS. 3A and 3B, arm assemblies 312A and 312B may be capable of moving from a lower vertical position, as seen in FIG. 3A, and to an upper vertical position, as seen in FIG. 3B. As can be appreciated, arm assemblies 312A and 312B may be capable of moving in other directions and rotating various degrees. Arm assemblies 312A and 312B may include mechanical arms 320A and 320B, and mechanical grippers 314A and 314B. Mechanical arms 320A and 320B, are coupled on a first end to arm assembly column 308 and rotatable coupled on a second end to corresponding mechanical grippers 314A and 314B. Mechanical arms 320A and 320B may also include joints such as joints 316A through 316L. In this regard, each mechanical arm 320A and 320B includes six joints. For example, and as illustrated in robot 300, mechanical arm 320A may include joints 316A, 316B, 316C, 316G, 316H, and 316K, and mechanical arm 320B may include joints 316D, 316E, 316F, 316I, 316J, and 316L. Joints 316A through 316L may allow robot 300 to recreate performance iterations (e.g., recreate manipulations of an object). Mechanical grippers 314A and 314B, each rotatably coupled to a second end of arm assemblies 320A and 320B via joints 316K and 316L, respectively, are generally configured to manipulate an object from a first position to a second position based on a generated policy. Mechanical grippers 314A and 314B include additional joints to further assist in performance recreation (e.g., object manipulation.). Each of the arm assemblies 312A and 312B allow for at least seven degrees of freedom of movement for recreating iterations of an observed demonstration. As can be appreciated, along with the at least seven degrees of freedom attained through the above mentioned joints of arm assemblies 312A and 312B, robot 300 is capable of at least ten degrees of freedom via assembly plate 322 capable of moving vertically and wheels 306 capable of moving in two dimensions on a given surface.

Photon detector 318 is generally responsible for generating visual images encoded in image data. Photon detector 318 may be any device that may generate visual image data encoded a visual image. The visual images may include images of a robot's environment, including objects within the environment. Photon detector 318 may generate image data by capturing electromagnetic (EM) waves or photons of various frequencies (or wavelengths). In some embodiments, photon detector 318 may be a stereoscopic camera, a 3D camera, and the like.

Figure 4A:
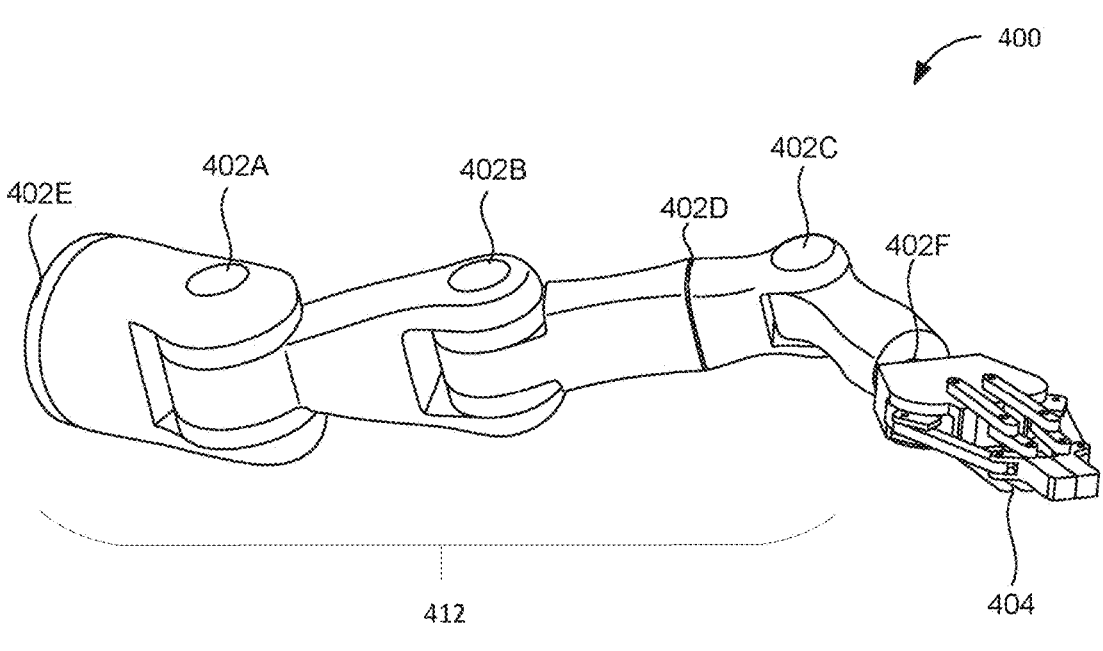
FIG. 4A illustrates a side view of an exemplary arm assembly that is consistent with the various embodiments presented herein.

Turning now to FIG. 4A, a side view of an exemplary arm assembly, designated generally as arm assembly 400, is shown. Arm assembly 400 includes mechanical arm 412, mechanical gripper 404, and joints 402A through 402F. Mechanical arm 412 may be rotatably coupled via a joint, such as joint 402E on a first end to an assembly plate, such as but not limited to assembly plate 322 of FIG. 3A, and rotatable coupled on a second end to mechanical gripper 404 via a joint, such as joint 402F. Mechanical arm 412 may include joints such as joints 402A through 402F. Joints 402A through 402F may allow a robot, such as but not limited to robot 300 of FIGS. 3A and 3B to recreate performance iterations (e.g., recreate manipulations of an object). Mechanical gripper 404 is generally configured to manipulate an object from a first position to a second position based on a generated policy. Mechanical gripper 404 may include additional joints to further assist in performance recreation (e.g., object manipulation.). Arm assembly 400 allows for at least seven degrees of freedom of movement for recreating iterations of an observed demonstration.

Figure 4B:
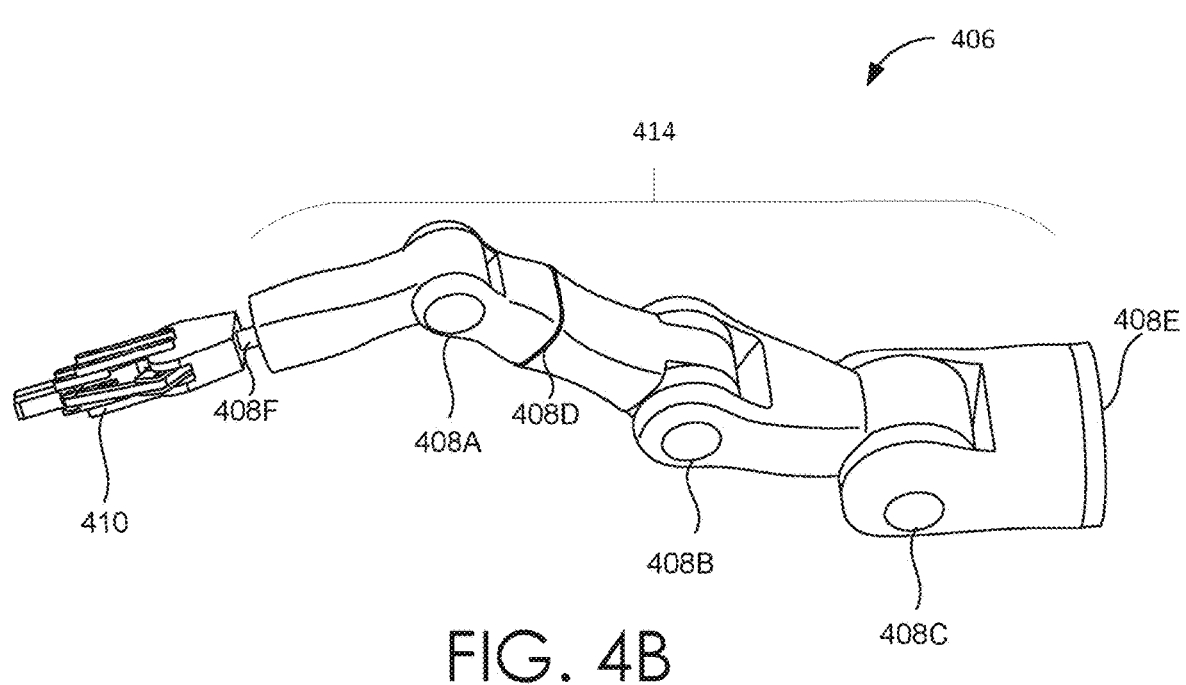
FIG. 4B illustrates a top view of an exemplary arm assembly that is consistent with the various embodiments presented herein.

Turning now to FIG. 4B, a side view of a second exemplary arm assembly, designated generally as arm assembly 406, is shown. Arm assembly 406 includes mechanical arm 414, mechanical gripper 410, and joints 408A through 408F. Mechanical arm 414 may be rotatably coupled via a joint, such as joint 408E, on a first end to an assembly plate, such as but not limited to assembly plate 322 of FIG. 3A, and rotatable coupled on a second end to mechanical gripper 410 via a joint, such as joint 408F. Mechanical arm 414 may include joints such as joints 408A through 408F. Joints 408A through 408F may allow a robot, such as but not limited to robot 300 of FIGS. 3A and 3B to recreate performance iterations (e.g., recreate manipulations of an object). Mechanical gripper 410 is generally configured to manipulate an object from a first position to a second position based on a generated policy. Mechanical gripper 410 may include additional joints to further assist in performance recreation (e.g., object manipulation.). Arm assembly 400 allows for at least seven degrees of freedom of movement for recreating iterations of an observed demonstration.

Figure 5A:
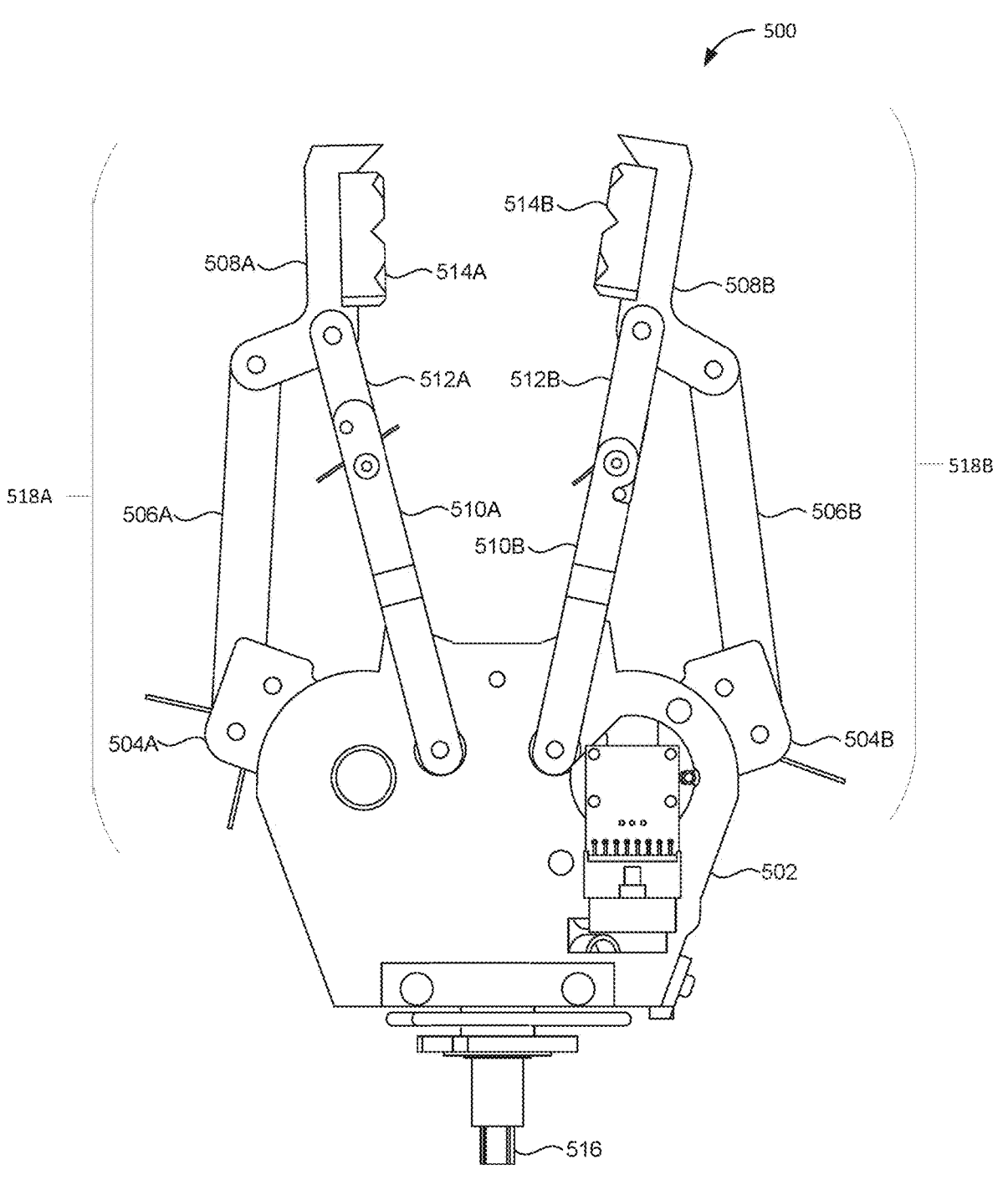
FIG. 5A illustrates an exemplary mechanical gripper in a first position that is consistent with the various embodiments presented herein.

Turning now to FIG. 5A, an exemplary mechanical gripper in an initial position, designated as mechanical gripper 500, is shown. As shown in FIG. 5A, mechanical gripper 500 includes mechanical fingers 518A and 518B and dock 502. Dock 502 includes bottom end 516. Bottom end 516 is rotatably coupled via a joint (e.g., joints 402F and 408F of FIGS. 4A and 4B, respectively) to a first end of a mechanical arm, such as mechanical arm 412 of FIG. 4A. Mechanical fingers 518A and 518B each may include connectors, such as connectors 508A through 512A of mechanical finger 518A, and 508B through 512B of mechanical finger 518B. Connectors 508A through 512A, and 508B through 512B allow a robot, such as robot 104 of FIG. 1 to recreate a performance iteration with objects of interest of varying shapes and sizes. In some embodiments, mechanical fingers 518A and 518B may be spring loaded to further, enabling mechanical gingers 518A and 518B to automatically adapt to objects of various shapes during an iteration of performance recreation. In some embodiments, mechanical gripper 500 may be moveably operated using a plurality of brushless DC motors.

Figure 5B:
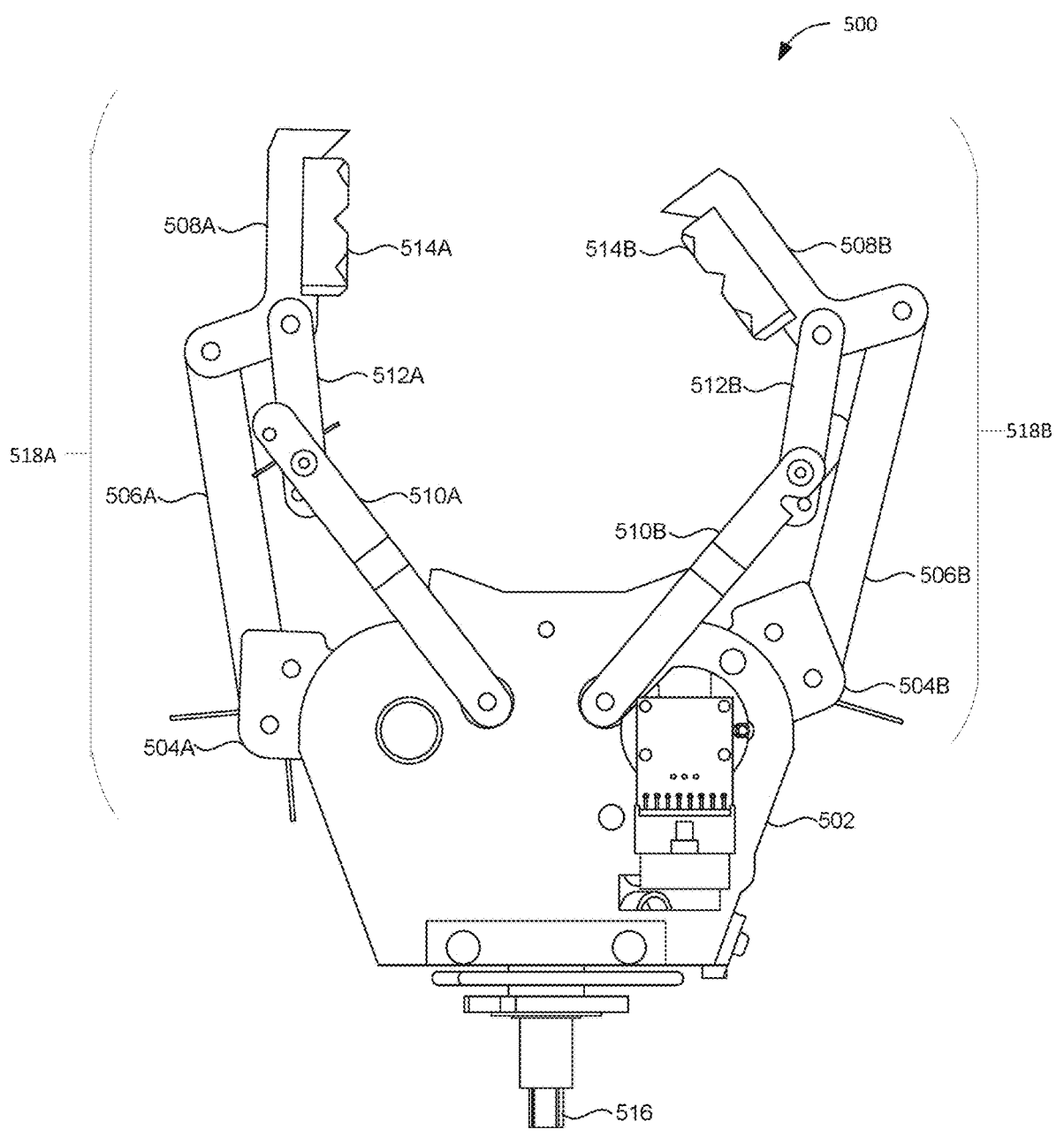
FIG. 5B illustrates an exemplary mechanical gripper in a second position that is consistent with the various embodiments presented herein.

Turning now to FIG. 5B, an exemplary mechanical gripper in a secondary position, designated as mechanical gripper 500, is shown. As shown in FIG. 5B, mechanical gripper 500 includes mechanical fingers 518A and 518B and dock 502. Dock 502 includes bottom end 516. Bottom end 516 is rotatable coupled to a first end of a mechanical arm, such as mechanical arm 412 of FIG. 4A. Mechanical fingers 518A and 518B each may include connectors, such as connectors 508A through 512A of mechanical finger 518A, and 508B through 512B of mechanical finger 518B. Connectors 508A through 512A, and 508B through 512B allow a robot, such as robot 104 of FIG. 1 to recreate a performance iteration with objects of interest of varying shapes and sizes. In some embodiments, mechanical fingers 518A and 518B may be spring loaded to further, enabling mechanical gingers 518A and 518B to automatically adapt to objects of various shapes during an iteration of performance recreation. In some embodiments, mechanical gripper 500 may be moveably operated using a plurality of brushless DC motors.

Figure 5C:
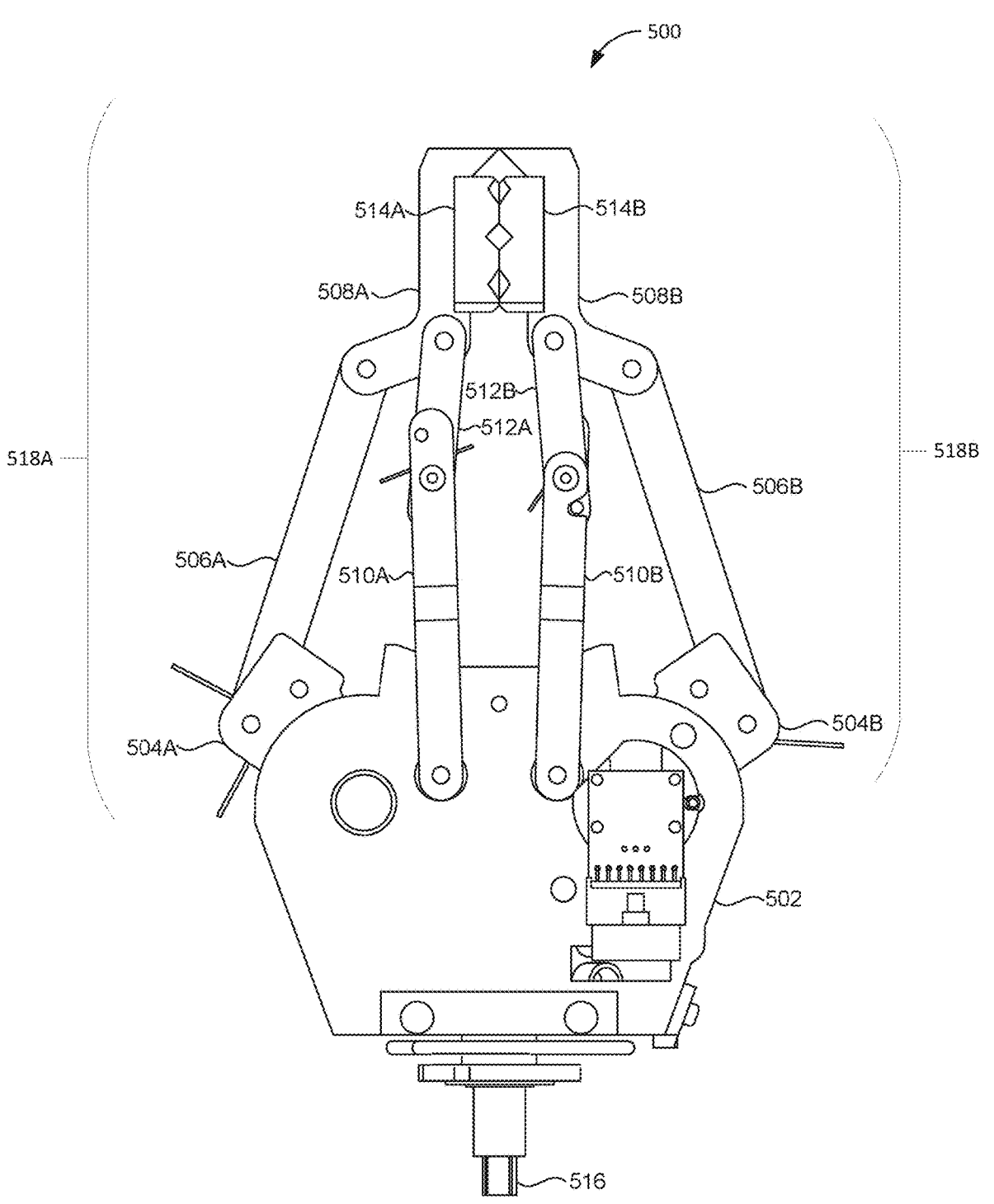
FIG. 5C illustrates an exemplary mechanical gripper in a third position that is consistent with the various embodiments presented herein.

Turning now to FIG. 5C, an exemplary mechanical gripper in a tertiary position, designated as mechanical gripper 500, is shown. As shown in FIG. 5C, mechanical gripper 500 includes mechanical fingers 518A and 518B and dock 502. Dock 502 includes bottom end 516. Bottom end 516 is rotatable coupled to a first end of a mechanical arm, such as mechanical arm 412 of FIG. 4A. Mechanical fingers 518A and 518B each may include connectors, such as connectors 508A through 512A of mechanical finger 518A, and 508B through 512B of mechanical finger 518B. Connectors 508A through 512A, and 508B through 512B allow a robot, such as robot 104 of FIG. 1 to recreate a performance iteration with objects of interest of varying shapes and sizes. In some embodiments, mechanical fingers 518A and 518B may be spring loaded to further, enabling mechanical gingers 518A and 518B to automatically adapt to objects of various shapes during an iteration of performance recreation. In some embodiments, mechanical gripper 500 may be moveably operated using a plurality of brushless DC motors.

Figure 5D:
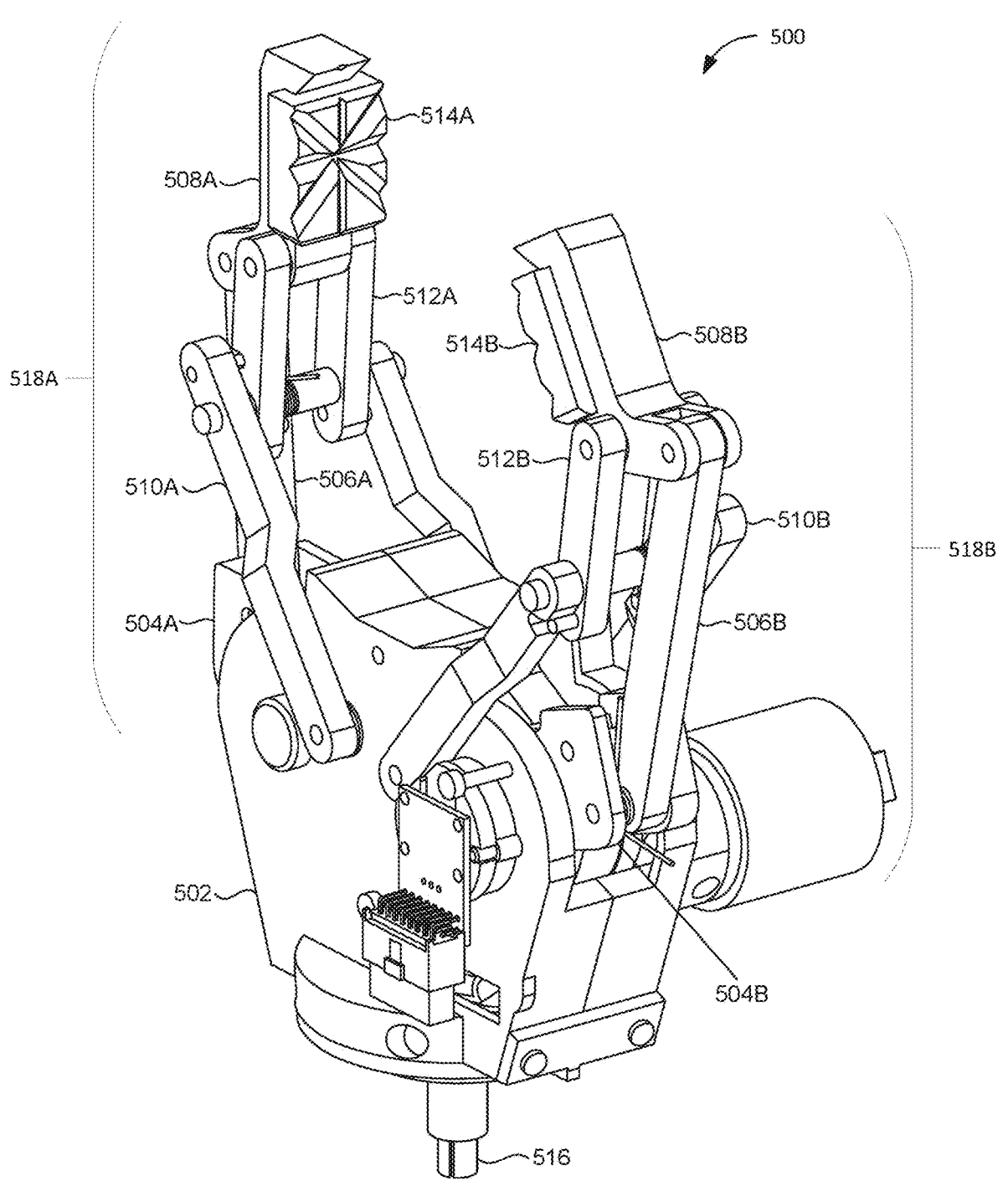
FIG. 5D illustrates an exemplary mechanical gripper in a fourth position that is consistent with the various embodiments presented herein.

Turning now to FIG. 5D, an exemplary mechanical gripper in a quaternary position, designated as mechanical gripper 500, is shown. As shown in FIG. 5D, mechanical gripper 500 includes mechanical fingers 518A and 518B and dock 502. Dock 502 includes bottom end 516. Bottom end 516 is rotatable coupled to a first end of a mechanical arm, such as mechanical arm 412 of FIG. 4A. Mechanical fingers 518A and 518B each may include connectors, such as connectors 508A through 512A of mechanical finger 518A, and 508B through 512B of mechanical finger 518B. Connectors 508A through 512A, and 508B through 512B allow a robot, such as robot 104 of FIG. 1 to recreate a performance iteration with objects of interest of varying shapes and sizes. In some embodiments, mechanical fingers 518A and 518B may be spring loaded to further, enabling mechanical gingers 518A and 518B to automatically adapt to objects of various shapes during an iteration of performance recreation. In some embodiments, mechanical gripper 500 may be moveably operated using a plurality of brushless DC motors.

Generalized Methods

Figure 8:
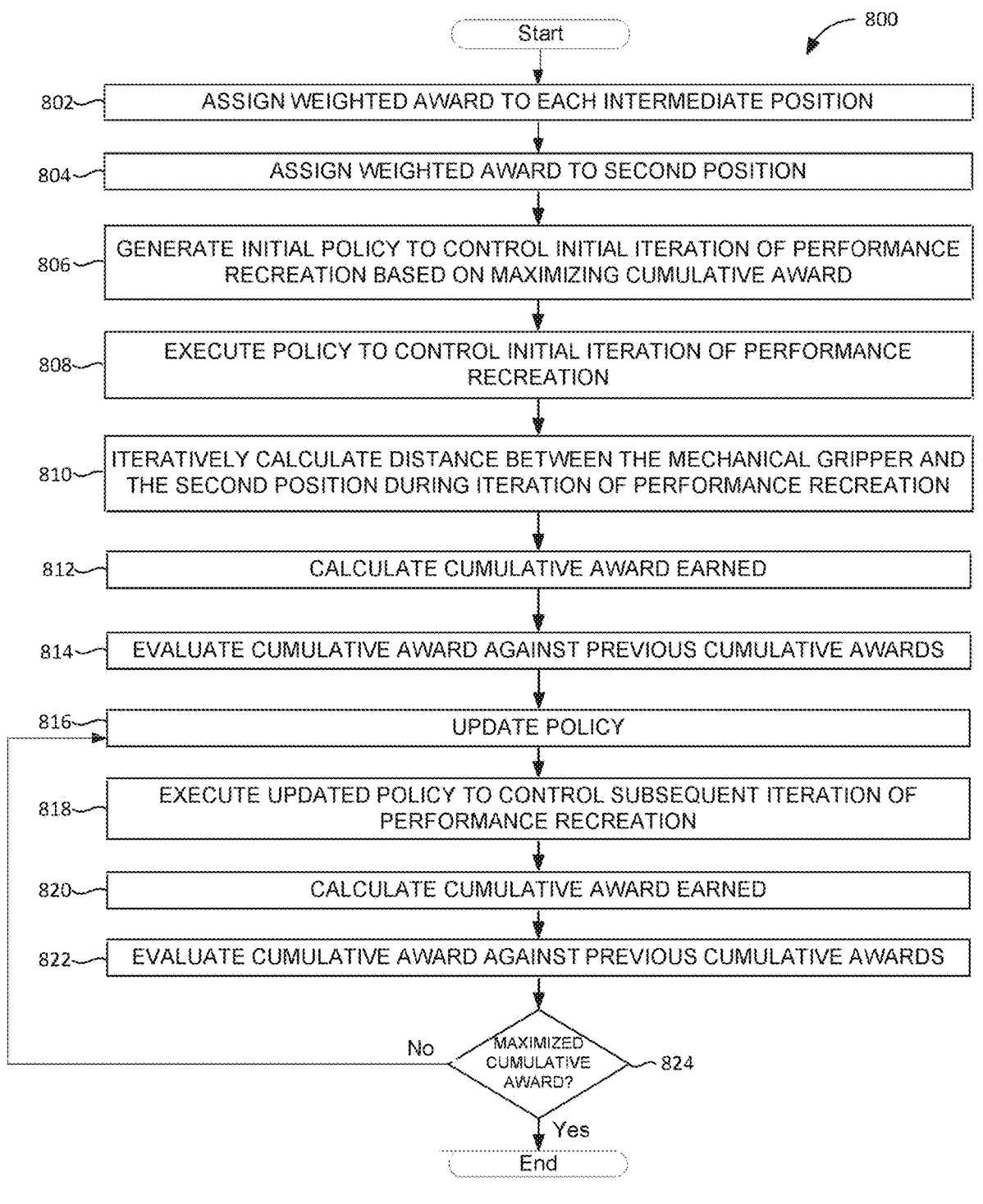
FIG. 8 illustrates one embodiment of a method for performing an iteration of an observed demonstrated performance that is consistent with the various embodiments presented herein.

Methods 600-800 of FIGS. 6-8, or portions thereof, may be performed and/or executed by any computing device, such as but not limited to computing devices 102, 104, 110, 118, and 120 of FIG. 1. A performance recreation manager (PRM), such as PRM 102 of FIG. 1 may perform and/or execute at least portions of methods 600-800. A demonstration engine (DE), such as but not limited to DE 112 of FIG. 1 may perform and/or execute at least portions of methods 600-800. Additionally, a reinforcement learning engine (RLE), such as but not limited to RLE 114 of FIG. 1 may perform and/or execute at least portions of methods 600-800.

Turning now to FIG. 6, FIG. 6 illustrates one embodiment of a method for observing and recreating a demonstrated performance that is consistent with the various embodiments presented herein. In various embodiments, method 600 may be performed by a demonstration engine, such as DE 112, and a reinforcement learning engine, such as RLE 114 of FIG. 1. Initially, at block 602, a first object is identified based on an object recognition analysis of image data. The image data includes a repositioning of the first object from a first position to a second position within an environment depicted in images in image data. As described above, the image data includes images and/or maps encoded in the image data may be provided by one or more visual cameras, such as but not limited to visual cameras of robot 104 (i.e., photon detector 318 or FIG. 3) or photon detector 120. The first object is identified by performing an object recognition analysis of image data, by for example, DE 112 of FIG. 1. Various way of performing object recognition analysis to recognize an object manipulation from a first position to a second position are discussed below with reference to FIG. 7. The object manipulation may be a repositioning of the object from a first position to a second position depicted in image data.

At block 604, a characterization of the manipulation of the first object is generate. As described above with reference to DE 112 of FIG. 1, the first position and the second position of the first object within the environment is encoded in association with the first object in the image data. This characterization of the manipulation may be encoded based on the object analysis of the image data by DE 112 of FIG. 1. In various embodiment, the encoding includes positions of the human appendages (e.g., hands, fingers, etc.) that are observed as manipulating the first object in the image data.

Referring to block 606, a policy is generated to control a mechanical gripper to recreate the repositioning of the first object. The policy may be generated by RLE 114, as described in reference to FIG. 1. The policy is based on iteratively increasing a cumulative award, the award based on encoding of the first and second position in association with the first object within the environment. Various embodiments of generating a policy are discussed, at least in conjunction with method 800 of FIG. 8.

Turning now to FIG. 7, FIG. 7 illustrates one embodiment of a method for observing a demonstrated performance that is consistent with the various embodiments presented herein. In various embodiments, method 700 may be performed by a demonstration engine, such as DE 112 of FIG. 1. Initially, at block 702, positions of human appendages (e.g., hands, fingers, etc.) are detected based on image data. As described above, the image data includes images and/or maps encoded in the image data may be provided by one or more visual cameras, such as but not limited to visual cameras of robot 104 (i.e., photon detector 318 or FIG. 3) or photon detector 120. In some embodiments, a neural network may be used to detect one or more human appendages in images/maps. The human appendages may be detected by a human detection component, such as but not limited to human detection component 210 of FIG. 2.

At block 704, non-zero optimal flow of connected pixels is detected in consecutive frames. The non-zero optimal flow of connected pixels may be determined by an object detection component, such as but not limited to object detection component 212 of FIG. 2. In some embodiments, non-zero optimal flow of connected pixels is detected based in part on proximity to the positions of the human appendages, as described with reference to FIG. 2 above.

Referring to block 706, a first object is identified from a plurality of object in the environment depicted in image data. The first object may be identified by, for example, object detection component 212 of FIG. 2. An object recognition analysis of image data may be conducted. The image data may depict repositioning of the first object, depicted by a non-zero optimal flow of connected pixels in proximity to human appendages, from a first position in the environment to a second position.

At block 708, translation and rotation parameters of the first object from first position to second position are determined. As described above with reference to pose estimation component 214 of FIG. 2, translation and rotation parameters may be determined based on volume matching technique or SIFT keypoints associated with the first and the second positions of the first object.

Further, at block 710, a characterization of the manipulation of the first object is generated. As described above with reference to pose estimation component 214 of FIG. 2, the first position and the second position of the first object within the environment is encoded in association with the first object in the image data. The characterization of the manipulation of the first object may be generated based on the object tracking analysis of image data. The characterization of the manipulation may also include translation and rotation parameters associated with repositioning of the first object from first position to the second position.

Turning now to FIG. 8, FIG. 8 illustrates one embodiment of a method for performing an iteration of an observed demonstrated performance that is consistent with the various embodiments presented herein. In various embodiments, method 800 may be performed by a reinforcement learning engine, such as RLE 114 of FIG. 1. Method 800 begins generally after a demonstration has been observed, such as a demonstration observed in method 700. Initially, at block 802 policy generating component 216 assigns a weighted award to each intermediate position between a first position and a second position. At block 804, policy generating component 216 assigns a weighted award to the second position. As described herein, the value of an award associated with each intermediate position is less than the value of the award associated with the second position. In this regard, the rewards are weighted.

Referring to block 806, policy generating component generates a policy to control a mechanical gripper, such as mechanical gripper 116 of FIG. 1. Here, the policy that policy generating component generates is based at least in part on maximizing a cumulative award. At block 808, motion control component 218 executes the policy by guiding mechanical gripper 116 through an iteration of performance recreation. At block 810, motion control component 218 iteratively calculates the distance between mechanical gripper 116 and the second position at each temporal step of a performance recreation iteration.

Further, at block 812, award component 220 calculates the cumulative award earned for each performance recreation iteration. At block 812, award component 220 evaluates the cumulate award earned against previously earned cumulative awards. Based on the evaluation, and at block 816, policy generating component 216 updates the policy in order to maximize, or at least increase, subsequent cumulative awards earned during subsequent iterations of performance recreation. At block 818, motion control component 218 executes the updated policy. At block 820, award component 220 calculates the cumulative award earned. At block 824, policy generating component determines whether the maximum cumulative award has been reached.

Exemplary Computing Device

Figure 9:
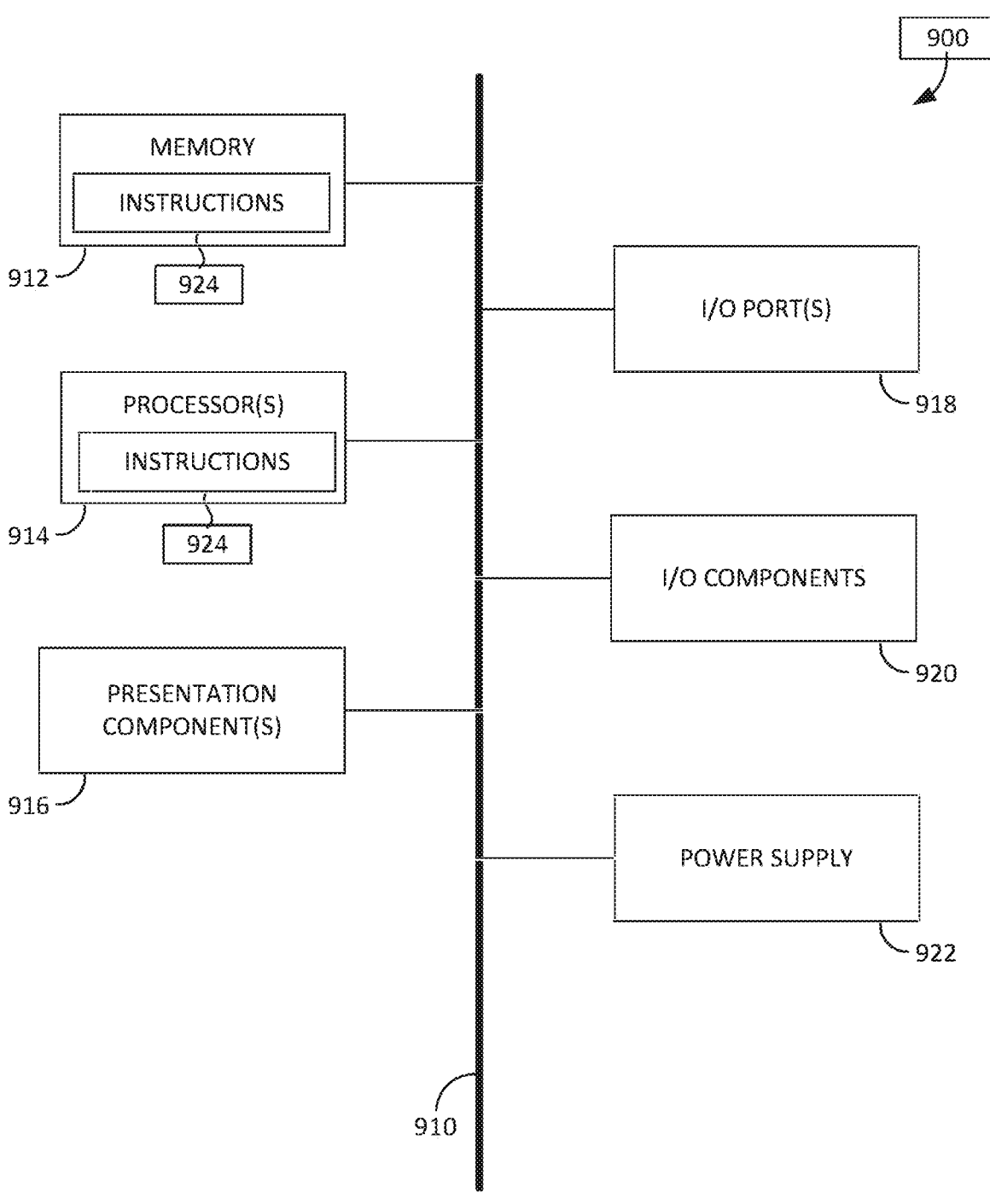
FIG. 9 illustrates an exemplary computing environment suitable for use in implementing embodiments of the present disclosure.

Having described embodiments of the present invention, an example operating environment in which embodiments of the present invention may be implemented is described below in order to provide a general context for various aspects of the present invention. Referring to FIG. 9, an illustrative operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 9 is merely illustrative of an example computing device that can be used in connection with one or more embodiments of the present disclosure. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. Memory 912 may be non-transitory memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 900 includes one or more processors that read data from various entities such as memory 912 or I/O components 920. Presentation component(s) 916 present data indications to a user or other device. Illustrative presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A robotic system comprising:
an arm assembly;
a photon detector
a processor device; and
a non-transitory computer-readable storage medium, coupled with the processor device, having instructions stored thereon, which, when executed by the processor device, cause the processor device to perform actions comprising:
  employing the arm assembly to initiate moving an object away from an initial position and towards a final position within an environment of the robotic system based on a policy learned through at least one previous iteration of the robotic system moving the object or another object between positions within the environment;
  employing the photon detector to acquire image data that depicts at least a current position of the arm assembly and the final position;
  determining, based on the image data, a difference between the current position of the arm assembly and the final position;
  calculating a movement of the arm assembly that traverses the determined difference between the current position of the arm assembly and the final position;
  performing the calculated movement that traverses the determined difference between the current position of the arm assembly and the final position to position the object at the final position; and
  updating, based on the calculated movement, the policy learned through the at least one previous iteration of the robotic system moving the object or another object between the positions within the environment by iteratively increasing a cumulative award;

wherein the cumulative award is based on a plurality of weights associated with each of the initial position, one or more positions of the arm assembly that are intermediate the initial position and the final position, and the final position, and wherein a weight of the plurality of weights that is associated with the final position is larger than the plurality of weights that are associated with the one or more positions of the arm assembly that are intermediate the initial position and the final position.

2. The robotic system of claim 1, the actions further comprising:

employing the photon detector to acquire training image data that depicts a human appendage moving the object from the initial position to the final position;

generating, based on an object tracking analysis of the training image data, a characterization of the human appendage moving of the object from the initial position to the final position; and generating, based on iteratively increasing the cumulative award, the policy that at least partially controls the arm assembly to move the object from the initial position to the final position.

3. The robotic system of claim 2, wherein generating the policy is based on a detection of non-zero optical flow of a set of connected pixels encoded in a plurality of consecutive image frames of the training image data and the characterization encoding each of the object and the initial position and the final position within the environment.

4. The robotic system of claim 3, wherein the detection of the non-zero optical flow includes a generation of a mask that separates a first subset of the set of connected pixels, which is associated with the object, from a second subset of the set of connected pixels, which is associated with the human appendage.

5. The robotic system of claim 4, wherein the cumulative award is based on at least the first subset of the set of connected pixels and a portion of the training image data that depicts of each of the object and the initial position and the final position within the environment.

6. The robotic system of claim 1, wherein updating the policy includes increasing the cumulative reward for the at least one previous iteration of moving the object or another object between the positions within the environment.

7. The robotic system of claim 1, the actions further comprising:

iteratively acquiring the image data as the arm assembly moves away from the initial position and towards the final position;

iteratively generating a feedback signal, based on the iteratively acquired image data, that iteratively encodes the difference between the current position of the arm assembly and the final position; and iteratively calculating, based on the iteratively generated feedback signal, the movement of the arm assembly that traverses the determined difference between the current position of the arm assembly and the final position.

8. The robotic system of claim 1, wherein the arm assembly includes a plurality of joints and the plurality of joints including a plurality of magnetic encoders, the actions further comprising:

employing the plurality of magnetic encoders to determine current positions of the plurality of joints.

9. A method comprising:

employing an arm assembly of a robot to initiate moving an object away from an initial position and towards a final position within an environment of the robot based on a policy learned through at least one previous iteration of the robot moving the object or another object between positions within the environment;

employing a photon detector of the robot to acquire image data that depicts at least a current position of the arm assembly and the final position;

determining, based on the image data, a difference between the current position of the arm assembly and the final position;

calculating a movement of the arm assembly that traverses the determined difference between the current position of the arm assembly and the final position;

performing the calculated movement that traverses the determined difference between the current position of the arm assembly and the final position to position the object at the final position; and updating, based on the calculated movement, the policy learned through the at least one previous iteration of the robot moving the object or another object between the positions within the environment by iteratively increasing a cumulative award;

wherein the cumulative award is based on a plurality of weights associated with each of the initial position, one or more positions of the arm assembly that are intermediate the initial position and the final position, and the final position, and wherein a weight of the plurality of weights that is associated with the final position is larger than the plurality of weights that are associated with the one or more positions of the arm assembly that are intermediate the initial position and the final position.

10. The method of claim 9, further comprising:

employing the photon detector to acquire training image data that depicts a human appendage moving the object from the initial position to the final position;

generating, based on an object tracking analysis of the training image data, a characterization of the human appendage moving of the object from the initial position to the final position; and generating, based on iteratively increasing a cumulative award, the policy that at least partially controls the arm assembly to move the object from the initial position to the final position.

11. The method of claim 10, wherein generating the policy is based on a detection of non-zero optical flow of a set of connected pixels encoded in a plurality of consecutive image frames of the training image data and the characterization encoding each of the object and the initial position and the final position within the environment.

12. The method of claim 11, wherein the detection of the non-zero optical flow includes a generation of a mask that separates a first subset of the set of connected pixels, which is associated with the object, from a second subset of the set of connected pixels, which is associated with the human appendage.

13. The method of claim 12, wherein the cumulative award is based on at least the first subset of the set of connected pixels and a portion of the training image data that depicts of each of the object and the initial position and the final position within the environment.

14. One or more non-transitory computer-readable storage media, coupled with a processor device, having instructions stored thereon, which, when executed by the processor device, causes the processor device to perform operations comprising:

employing an arm assembly of a robot to initiate moving an object away from an initial position and towards a final position within an environment of the robot based on a policy learned through at least one previous iteration of the robot moving the object or another object between positions within the environment;

employing a photon detector of the robot to acquire image data that depicts at least a current position of the arm assembly and the final position;

determining, based on the image data, a difference between the current position of the arm assembly and the final position;

calculating a movement of the arm assembly that traverses the determined difference between the current position of the arm assembly and the final position;

performing the calculated movement that traverses the determined difference between the current position of the arm assembly and the final position to position the object at the final position; and updating, based on the calculated movement, the policy learned through the at least one previous iteration of the robot moving the object or another object between positions within the environment by iteratively increasing a cumulative award;

wherein the cumulative award is based on a plurality of weights associated with each of the initial position, the one or more positions of the arm assembly that are intermediate the initial position and the final position, and the final position, and wherein a weight of the plurality of weights that is associated with the final position is larger than the plurality of weights that are associated with the one or more positions of the arm assembly that are intermediate the initial position and the final position.

15. The one or more non-transitory computer-readable storage media of claim 14, the operations further comprising:

iteratively acquiring the image data as the arm assembly moves away from the initial position and towards the final position;

iteratively generating a feedback signal, based on the iteratively acquired image data, that iteratively encodes the difference between the current position of the arm assembly and the final position; and iteratively calculating, based on the iteratively generated feedback signal, the movement of the arm assembly that traverses the determined difference between the current position of the arm assembly and the final position.

16. The one or more non-transitory computer-readable storage media of claim 14, wherein the arm assembly includes a plurality of joints and the plurality of joints including a plurality of magnetic encoders, the operations further comprising:

employing the plurality of magnetic encoders to determined current positions of the plurality of joints.

* * * * *